(12) United States Patent
Arai

(10) Patent No.: US 12,247,999 B2
(45) Date of Patent: Mar. 11, 2025

(54) SURFACE ANALYSIS METHOD, SURFACE ANALYSIS SYSTEM, AND SURFACE ANALYSIS PROGRAM

(71) Applicant: Showa Denko Materials Co., Ltd., Tokyo (JP)

(72) Inventor: Yuki Arai, Tokyo (JP)

(73) Assignee: RESONAC CORPORATION, Tokyo (JP)

(*) Notice: Subject to any disclaimer, the term of this patent is extended or adjusted under 35 U.S.C. 154(b) by 292 days.

(21) Appl. No.: 18/012,546

(22) PCT Filed: Jul. 31, 2020

(86) PCT No.: PCT/JP2020/029511
§ 371 (c)(1),
(2) Date: Dec. 22, 2022

(87) PCT Pub. No.: WO2022/024370
PCT Pub. Date: Feb. 3, 2022

(65) Prior Publication Data
US 2023/0273237 A1    Aug. 31, 2023

(51) Int. Cl.
*G01Q 60/24*    (2010.01)

(52) U.S. Cl.
CPC .................. *G01Q 60/24* (2013.01)

(58) Field of Classification Search
CPC ...................................................... G01Q 60/24
See application file for complete search history.

(56) References Cited

U.S. PATENT DOCUMENTS

2010/0312495 A1* 12/2010 Haviland ............... B82Y 35/00
850/1
2020/0216824 A1* 7/2020 Lu ........................... G01Q 60/24
2021/0180012 A1* 6/2021 Yang ....................... C12N 5/0075

FOREIGN PATENT DOCUMENTS

JP    2018-173310 A    11/2018
JP    2018-178016 A    11/2018

* cited by examiner

*Primary Examiner* — Nicole M Ippolito
(74) *Attorney, Agent, or Firm* — FITCH, EVEN, TABIN & FLANNERY, LLP

(57) ABSTRACT

A surface analysis method according to an embodiment includes: acquiring a force curve corresponding to measurement of a sample surface by a scanning probe microscope; calculating a physical quantity of an organic material forming the sample surface based on the force curve, for each of an observation point group; and outputting analysis data indicating the physical quantity of each of the observation point group. The acquiring the force curve includes acquiring the force curve at each of a plurality of observation points on a Y-column extending along a X-direction (a direction along which the probe reciprocates with respect to a stage). The calculating the physical quantity includes: generating a force curve matrix indicating the force curve at each of the plurality of observation points; and calculating the physical quantity at each of the plurality of observation points using the force curve matrix.

11 Claims, 14 Drawing Sheets

SURFACE ANALYSIS METHOD, SURFACE ANALYSIS SYSTEM, AND SURFACE ANALYSIS PROGRAM

CROSS-REFERENCE TO RELATED APPLICATIONS

This application is a U.S. national phase application filed under 35 U.S.C. § 371 of International Application No. PCT/JP2020/029511, filed Jul. 31, 2020, designating the United States, which is incorporated herein by reference in its entirety.

TECHNICAL FIELD

One aspect of the present disclosure relates to a surface analysis method, a surface analysis system, and a surface analysis program.

BACKGROUND ART

A method for analyzing a surface of a sample including an organic material is conventionally known. For example, Patent Document 1 describes a method for measuring mechanical properties characterized in that measurement is performed using a sample having a thickness determined based on a size of a structure in a polymer composite material. This document also describes that mechanical properties such as hardness and friction force of the surface of the sample can be measured by an atomic force microscope (AFM). Patent Document 2 describes a method of measuring an elastic modulus using a scanning probe microscope. This method includes: acquiring force curve measurement data at a plurality of observation points on a surface of an object to be measured; calculating an actually-measured load displacement curve from the force curve measurement data for each observation point; and calculating an elastic modulus for each observation point from the actually-measured load displacement curve, using a theoretical formula.

CITATION LIST

Patent Literature

[Patent Document 1] JP 2018-178016 A
[Patent Document 2] JP 2018-173310 A

SUMMARY OF INVENTION

Technical Problem

It is desirable to provide a technique for analyzing an organic material formed on a surface of a sample more efficiently.

Solution to Problem

A surface analysis method according to an aspect of the present disclosure includes: acquiring a force curve corresponding to measurement of a sample surface by a scanning probe microscope, the scanning probe microscope performing the measurement at each of an observation point group on the sample surface by, while reciprocating a probe with respect to a stage along a X-direction along a horizontal surface, moving the probe in one direction with respect to the stage along a Y-direction which is along the horizontal surface and orthogonal to the X-direction; calculating a physical quantity of an organic material forming the sample surface based on the force curve, for each of the observation point group; and outputting analysis data indicating the physical quantity of each of the observation point group. The acquiring the force curve includes acquiring, for each of at least one Y-column extending along the X-direction, the force curve at each of a plurality of observation points on the Y-column. The calculating the physical quantity includes: generating, for each of the at least one Y-column, a force curve matrix indicating the force curve at each of the plurality of observation points on the Y-column; and calculating, for each of the at least one Y-column, the physical quantity at each of the plurality of observation points using the force curve matrix.

A surface analysis system according to an aspect of the present disclosure includes at least one processor. The at least one processor is configured to execute: acquiring a force curve corresponding to measurement of a sample surface by a scanning probe microscope, the scanning probe microscope performing the measurement at each of an observation point group on the sample surface by, while reciprocating a probe with respect to a stage along a X-direction along a horizontal surface, moving the probe in one direction with respect to the stage along a Y-direction which is along the horizontal surface and orthogonal to the X-direction; calculating a physical quantity of an organic material forming the sample surface based on the force curve, for each of the observation point group; and outputting analysis data indicating the physical quantity of each of the observation point group. In the acquiring the force curve, the at least one processor is configured to acquire, for each of at least one Y-column extending along the X-direction, the force curve at each of a plurality of observation points on the Y-column. In the calculating the physical quantity, the at least one processor is configured to: generate, for each of the at least one Y-column, a force curve matrix indicating the force curve at each of the plurality of observation points on the Y-column; and calculate, for each of the at least one Y-column, the physical quantity at each of the plurality of observation points using the force curve matrix.

A surface analysis program according to an aspect of the present disclosure causes a computer to a computer to execute: acquiring a force curve corresponding to measurement of a sample surface by a scanning probe microscope, the scanning probe microscope performing the measurement at each of an observation point group on the sample surface by, while reciprocating a probe with respect to a stage along a X-direction along a horizontal surface, moving the probe in one direction with respect to the stage along a Y-direction which is along the horizontal surface and orthogonal to the X-direction; calculating a physical quantity of an organic material forming the sample surface based on the force curve, for each of the observation point group; and outputting analysis data indicating the physical quantity of each of the observation point group. The acquiring the force curve includes acquiring, for each of at least one Y-column extending along the X-direction, the force curve at each of a plurality of observation points on the Y-column. The calculating the physical quantity includes: generating, for each of the at least one Y-column, a force curve matrix indicating the force curve at each of the plurality of observation points on the Y-column; and calculating, for each of the at least one Y-column, the physical quantity at each of the plurality of observation points using the force curve matrix.

In these aspects, the plurality of force curves corresponding to the plurality of observation points arranged in a row along the X-direction are represented by a matrix. By using this matrix, the physical quantities of the organic material at the plurality of observation points can be calculated at one time. As a result, the organic material formed on the surface of the sample can be analyzed more efficiently.

Advantageous Effects of Invention

According to an aspect of the present disclosure, an organic material formed on a surface of a sample can be analyzed more efficiently.

DESCRIPTION OF EMBODIMENTS

Figure 1:
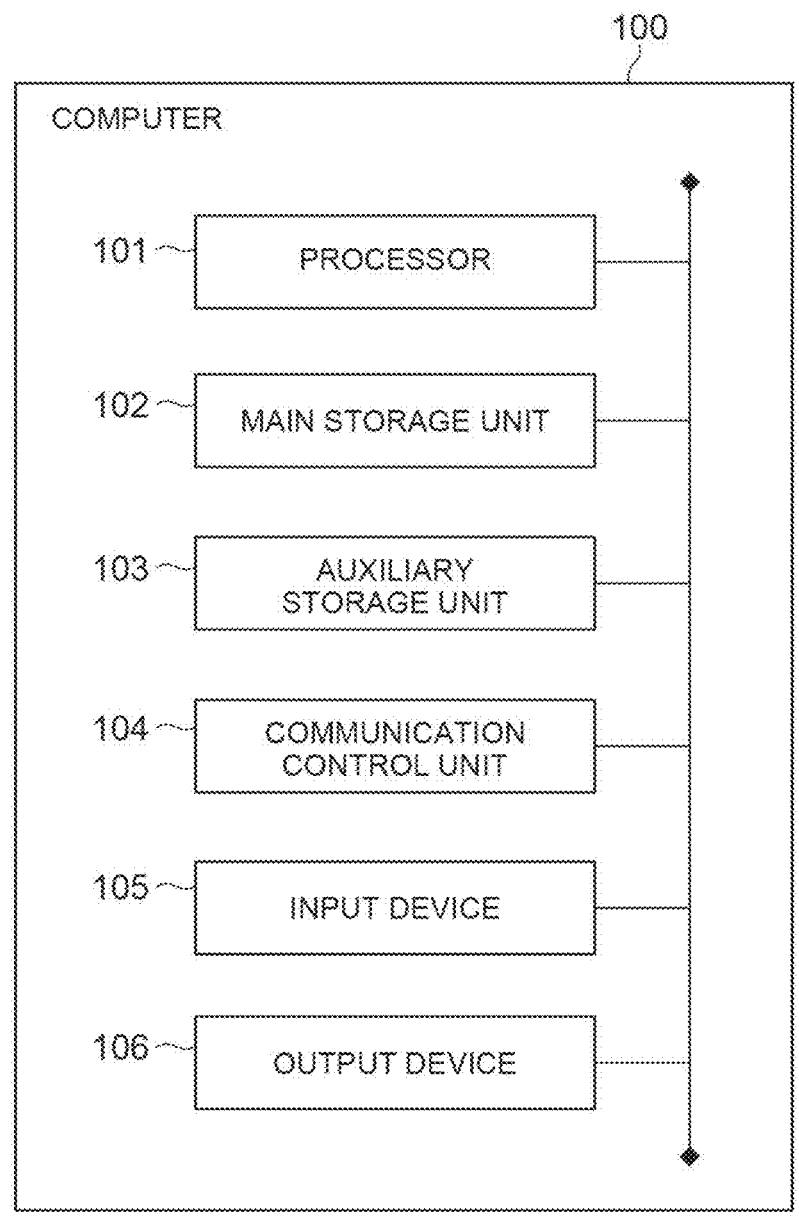
FIG. 1 is a diagram showing an example hardware configuration of a computer constituting a surface analysis system according to an embodiment.

Hereinafter, embodiments of the present invention will be described in detail with reference to the accompanying drawings. In the description of the drawings, the same or equivalent elements are denoted by the same reference numerals, and redundant description is omitted.

[Configuration of Surface Analysis System]

A surface analysis system 10 according to an embodiment is a computer system that analyzes a surface of a sample (also referred to as a "sample surface" in the present disclosure) that may include an organic material. The organic material refers to a material including an organic compound. The sample refers to a substance whose surface is to be analyzed. In one example, the "sample including an organic material" is a material whose surface is formed by an organic material, for example, a material in which a layer of an organic material is formed on a surface of powder such as filler. The powder refers to an aggregate of a large number of fine solid particles. The analysis of sample surface refers to processing for clarifying some characteristics of the sample surface.

The surface analysis system 10 performs analysis using information obtained from a scanning probe microscope. The scanning probe microscope refers to a microscope that observes physical properties (for example, shape, property, state, etc.) of a surface of a material by moving the surface so as to trace the surface with a cantilever probe. An example of the scanning probe microscope may be an atomic force microscope (AFM), but the type of the scanning probe microscope used together with the surface analysis system 10 is not limited thereto. In the present embodiment, an AFM 30 is shown as an example of the scanning probe microscope. The AFM 30 may support various measurement methods such as contact mode, dynamic mode, force mode, etc. In the force mode, various physical properties such as elastic modulus, maximum breaking force (adhesive force), and surface position may be obtained.

The surface analysis system 10 is composed of one or more computers. In a case where a plurality of computers are used, these computers are connected via a communication network such as the internet or an intranet, whereby one surface analysis system 10 is logically constructed. The surface analysis system 10 may be implemented as a server in a client-server system or implemented on a stand-alone computer.

FIG. 1 is a diagram showing an example of a general hardware configuration of a computer 100 constituting the surface analysis system 10. The computer 100 includes a processor (for example, a CPU) 101 that executes an operating system, an application program, and the like, a main storage unit 102 including a ROM and a RAM, an auxiliary storage unit 103 including a hard disk, a flash memory, and the like, a communication control unit 104 including a network card or a wireless communication module, an input device 105 such as a keyboard and a mouse, and an output device 106 such as a monitor.

Each functional element of the surface analysis system 10 is implemented by causing the processor 101 or the main storage unit 102 to read a predetermined program and causing the processor 101 to execute the program. The processor 101 operates the communication control unit 104, the input device 105, or the output device 106 in accordance with the program, and reads and writes data in the main storage unit 102 or the auxiliary storage unit 103. The date or database required for processing is stored in the main storage unit 102 or the auxiliary storage unit 103.

Figure 2:
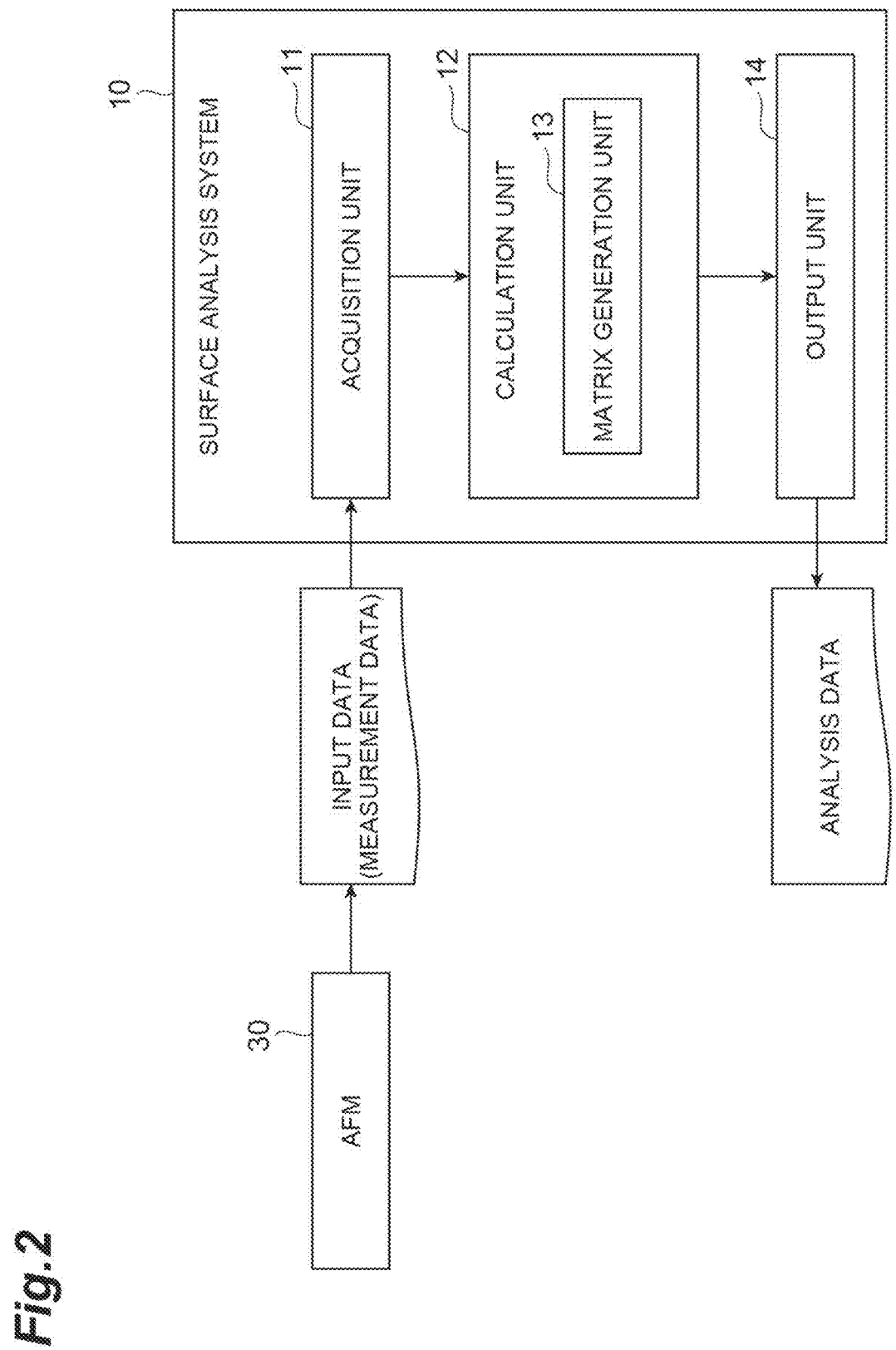
FIG. 2 is a diagram showing an example functional configuration of a surface analysis system according to an embodiment.

FIG. 2 is a diagram showing an example functional configuration of the surface analysis system 10. In one example, the surface analysis system 10 includes an acquisition unit 11, a calculation unit 12, a matrix generation unit 13, and an output unit 14 as functional elements. The acquisition unit 11 is a functional element that acquires measurement data (also referred to as "input data" in the present disclosure) obtained by the AFM 30. The calculation unit 12 is a functional element that calculates a physical quantity of the sample surface or the organic material using the input data. In the present disclosure, the physical quantity refers to a numerical value indicating a physical property of the sample surface or the organic material. The matrix generation unit 13 is a functional element that generates various matrices used in that calculation. The matrix generation unit 13 functions as part of the calculation unit 12. The output unit 14 is a functional element that outputs analysis data indicating the calculated physical quantity.

A method of constructing the surface analysis system 10 is not limited. In a case where the surface analysis system 10 is configured by a plurality of computers, any processor may execute any functional element in any policy. The surface analysis system 10 may be incorporated into the AFM 30 or may be a computer system independent of the AFM 30. It should be noted that in FIG. 1, the surface analysis system 10 is represented by a block different from that of the AFM 30, merely for convenience of explanations.

In this embodiment, the surface analysis system 10 processes data obtained in the measurement in the force mode by the AFM 30 and analyzes the sample surface. The AFM 30 performs the measurement in the force mode at each of observation point group on the sample surface to obtain the measurement data. The surface analysis system 10 receives the measurement data obtained from each observation point as the input data. Before describing the processing by the surface analysis system 10 in detail, the AFM 30 the observation point, which are premises of the processing, will be described.

Figure 3:
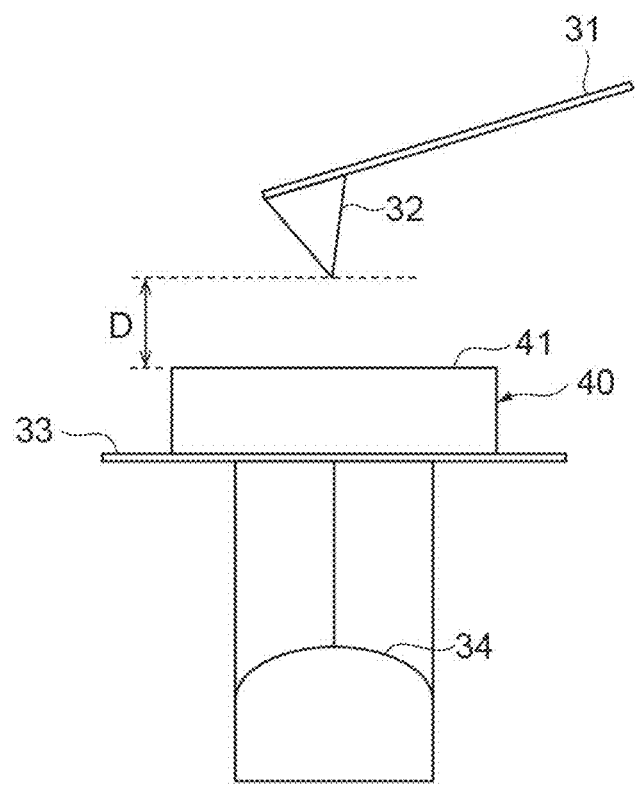
FIG. 3 is a diagram schematically showing an example measurement unit of an atomic force microscope.

FIG. 3 is a diagram schematically showing an example of a measurement unit of the AFM 30. This figure shows a probe 32 provided at an end portion of a cantilever 31, a sample 40 placed on a stage 33, and a piezoelectric element 34 for moving the sample 40 in three-dimensional directions with high accuracy. In the present disclosure, a distance D between the tip of the probe 32 and a sample surface 41 is referred to as the probe-surface distance.

Figure 4:
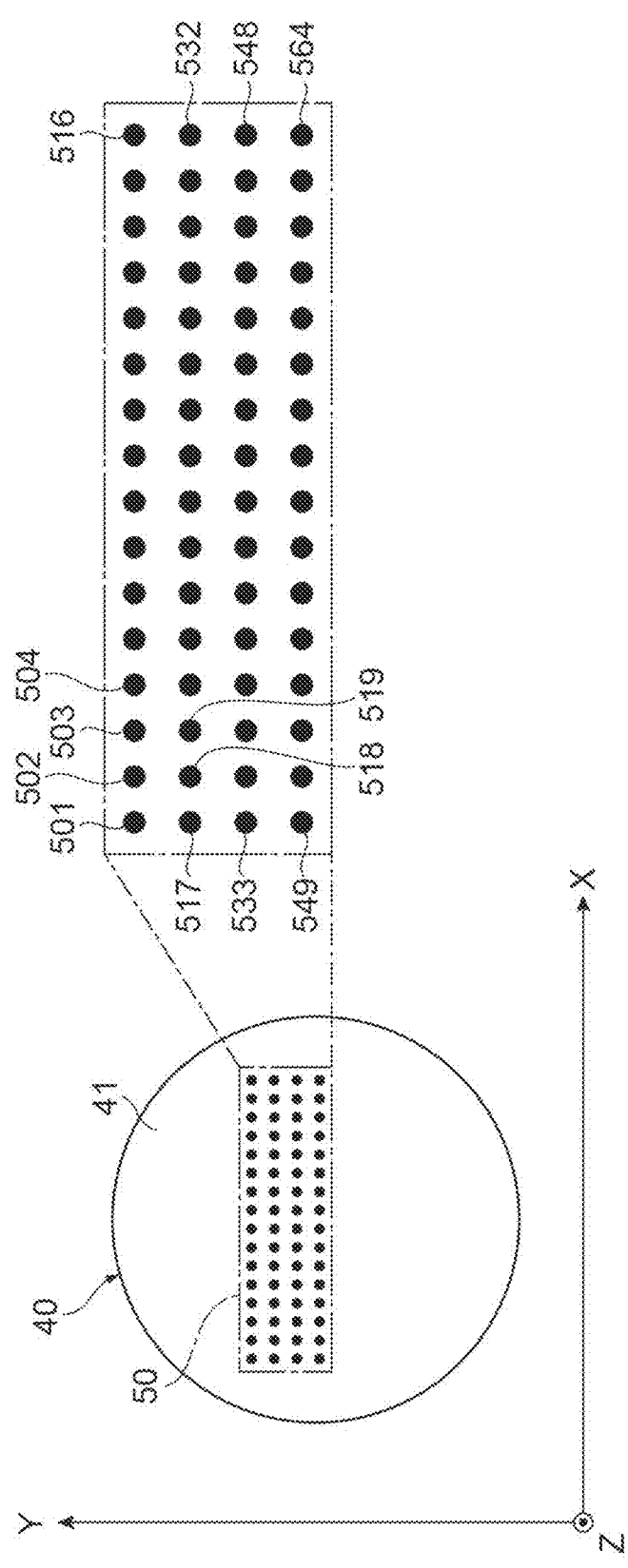
FIG. 4 is a diagram showing an example observation point group on a sample.

The observation point refers to a position at which the measurement in the force mode is performed, and more specifically, a position at which the probe 32 comes into contact. The observation point group is set on a XY-plane (horizontal surface) along the surface of the stage 33, and thus the position of each observation point is defined by an X-coordinate and a Y-coordinate. FIG. 4 is a diagram showing an example of an observation point group 50 on the sample surface 41. In this example, the observation point group 50 is a set of 64 observation points, with 16 observation points in each column along the X-direction, and 4 observation points in each column along the Y-direction. In the enlarged part of FIG. 4, parts of individual observation points are shown in a differentiated manner. The X-direction and Y-direction are directions along the horizontal surface, and the Y-direction is orthogonal to the X-direction. The Z-direction is a direction (vertical direction) orthogonal to the XY plane.

In the force mode, the AFM 30 moves the stage 33 along the Z-direction at a first observation point 501 to perform the measurement at the observation point 501. Subsequently, the AFM 30 moves the stage 33 along the X-direction to position the probe 32 to an observation point 502 next to the observation point 501 in the X-direction. The AFM 30 then moves the stage 33 along the Z-direction to perform the measurement at the observation point 502. Subsequently, the AFM 30 moves the stage 33 along the X-direction and performs the measurement in the same way in an observation point 503 next to the observation point 502 in the X-direction. The AFM 30 then performs the measurement on each of observation points 504-516 in this order in the same control. Subsequently, the AFM 30 moves the stage 33 along the X- and Y-directions to position the probe 32 to an observation point 517 next to the observation point 501 in the Y-direction. The AFM 30 then moves the stage 33 along the Z-direction to perform measurement at the observation point 517. Thereafter, the AFM 30 changes the stage 33 along the X-direction to position the probe 32 to an observation point 518 next to the observation point 517 in the X-direction. The AFM 30 then moves the stage 33 along the Z-direction to perform the measurement at the observation point 502. Thereafter, the AFM 30 performs the measurement at observation points 519-564 in this order in the same procedure.

In the force mode, a scanning probe microscope such as AFM 30 moves a probe in one direction with respect to a stage along the Y-direction while reciprocating the probe with respect to the stage along the X-direction. The scanning probe microscope performs the measurement at each of the observation point group on the sample surface while controlling the positional relationship between the probe and the stage in the XY plane in such a manner. At each measurement point, the scanning probe microscope performs the measurement while reciprocating the probe with respect to the stage along the Z-direction. Therefore, it can be said that the positional relationship between the probe and the stage changes first along the Z-direction, then along the X-direction, and finally along the Y-direction. That is, the movement along the Z-direction has the highest priority, the movement along the X-direction has the second highest priority, and the movement along the Y-direction has the lowest priority. In other words, the Z-direction is the fastest scan direction, the X-direction is the second fastest scan direction, and the Y-direction is the slowest scan direction. In the present disclosure, reflecting such an operation, the Z-direction is also referred to as a fast scan direction of the scanning probe microscope (for example, AFM 30), the X-direction is also referred to as a middle scan direction of the scanning probe microscope, and the Y-direction is also referred to as a slow scan direction of the scanning probe microscope. In general, limiting to the X- and Y-directions, the X-direction may be referred to as a fast scan direction, and the Y-direction may be referred to as a slow scan direction. Typically, in consideration of such scan directions, the observation point group is set such that the number of measurement points constituting one row along the X-direction is larger than the number of measurement points constituting one row along the Y-direction. This means that the amount of information of one column along the X-direction is larger than the amount of information of one column along the Y-direction.

In the present disclosure, for convenience, a set of a plurality of observation points arranged in a row along the X-direction is referred to as a "Y-column". Thus, the Y-column extend along the X-direction. Further, an observation point constituting the Y-column is referred to as an "observation point on the Y-column". In the example of FIG. 4, there are a Y-column composed of the observation points 501-516, a Y-column composed of the observation points 517-532, a Y-column composed of the observation points 533-548 and a Y-column composed of the observation points 549-564.

In one example, the sample may be powder that is not held by a carrier (i.e., elemental powder) and the sample surface may be the surface of the powder. In this case, the powder is physically fixed on the stage, and the measurement is performed after the periphery of the powder is filled with a given aqueous solution. Examples of the aqueous solution used to measure the sample surface include, but are not limited to, aqueous solution of sodium chloride (NaCl), aqueous solution of sodium sulfate ($Na_2SO_4$), and aqueous solution of potassium chloride (KCl). The ionic strength of the aqueous solution is preferably 0.01 (mol/L) or more. For example, the ionic strength of NaCl aqueous solution having a molar concentration of 10 mM (mmol/L) is 0.01 (mol/L).

[Operation of Surface Analysis System]

Figure 5:
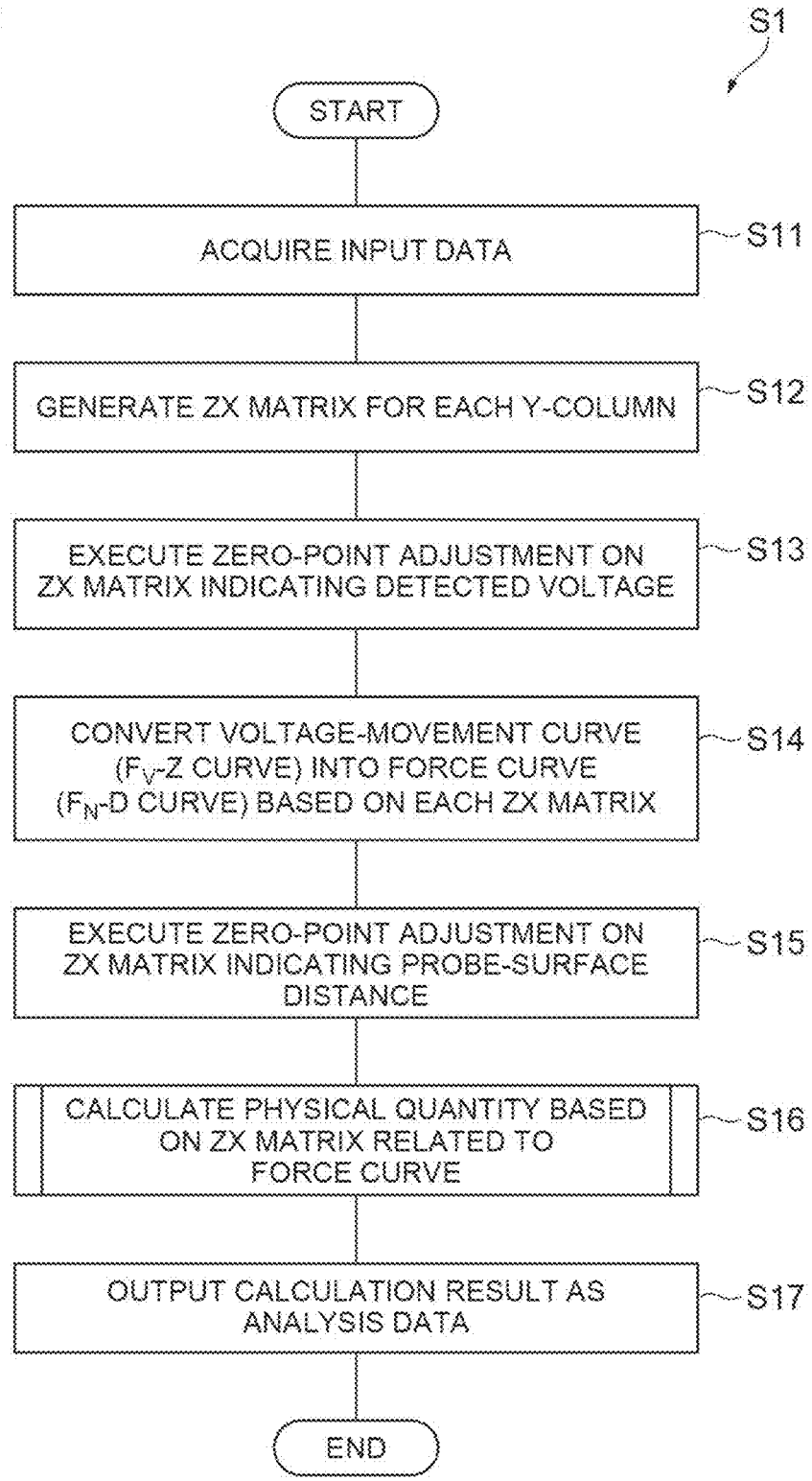
FIG. 5 is a flowchart showing an example operation of the surface analysis system according to the embodiment.

The operation of the surface analysis system 10 and a surface analysis method according to the present embodiment will be described with reference to FIG. 5. FIG. 5 is a flowchart showing an example operation of the surface analysis system 10 as a processing flow S1. The trigger of the processing flow S1 is not limited. For example, the processing flow S1 may be executed in response to an operation by a user of the surface analysis system 10. Alternatively, the processing flow S1 may be executed automatically without a user operation in response to processing at the AFM or other device.

In step S11, the acquisition unit 11 acquires input data with respect to an observation point group. The input data is generated by the AFM 30 that has measured the sample surface and is used to analyze the sample surface. A method of acquiring input data is not limited. For example, the acquisition unit 11 may directly acquire the input data from the AFM 30, or may read data stored in a predetermined storage unit (for example, a memory, a database, etc.) from the AFM 30, as the input data from the storage unit. Alternatively, the acquisition unit 11 may receive the input data from another computer.

The input data indicates, for each observation point, the corresponding relationship between the position of the observation point and the measurement result at the observation point. As long as the corresponding relationship can be seen, the input data may be described in one data file or may be separately described in a plurality of data files (for example, each data file may indicate only data for one observation point). In one example, the measurement result at each observation point includes a change over time in a voltage (approach voltage) detected when the probe approaches the sample surface, a change over time in a voltage (release voltage) detected when the probe having been in contact with the sample surface moves away from the sample surface, and a change over time in an amount of movement of the piezoelectric element. Hereinafter, the "amount of movement of the piezoelectric element" is also simply referred to as "amount of movement". Based on the change over time in the approach voltage, a force curve indicating the transition of the force measured when the probe approaches the sample surface can be obtained as an approach curve. In addition, based on a change over time in the release voltage a force curve, a force curve indicating a force measured when a probe having been in contact with the sample surface moves away from the sample surface may be obtained as a release curve. The measurement result at each observation point may include other data such as a maximum breaking force, a surface position, etc. The maximum breaking force is a maximum value of the force applied to the probe that is about to move away from the sample surface, and is also referred to as adhesion. The surface position may be indicated by the distance in the Z-direction from a given reference surface to the sample surface.

In step S12, the matrix generation unit 13 generates a ZX matrix for each Y-column extending along the X-direction. The ZX matrix is a matrix representing a combination of a value obtained along the Z-direction (fast scan direction) and a value obtained along the X direction (middle scan direction). It can also be said that the ZX matrix is a matrix indicating a distribution of physical quantities in the ZX plane (in other words, a distribution of physical quantities on one corresponding Y-column). In one example, the matrix generation unit 13 generates, for each Y-column, a ZX matrix A indicating the approach voltage, a ZX matrix B indicating the release voltage, and a ZX matrix C indicating the amount of movement of the piezoelectric element. Each of the ZX matrices A and B is an example of a voltage matrix indicating a change over time in voltage at each of a plurality of observation points on one Y-column. The ZX matrix C is an example of a movement matrix indicating a change over time in the amount of movement at each of the plurality of observation points on one Y-column. A voltage-movement curve ($F_v$-Z curve) related to the approach voltage may be represented by two ZX matrices A and C. Further, a voltage-movement curve ($F_v$-Z curve) related to the release voltage may be represented by two ZX matrices B and C. The voltage-movement curve ($F_v$-Z curve) is a curve indicating a relationship between the amount of movement Z (unit: nm (nanometer)) of the piezoelectric element of the scanning probe microscope (for example, AFM 30) and a voltage $F_v$ (unit: V (volt)) detected by a detector of the scanning probe microscope. The generation of the ZX matrices A, B, and C means obtaining voltage-movement curves.

It is assumed that N approach voltages, N release voltages, and N amounts of movement are obtained in one observation point. Also, it is assumed that there are M observation points on each Y-column. In this case, the matrix generation unit 13 generates, for each Y-column, an N×M matrix (ZX matrix A) indicating the approach voltage at each of the M observation points, an N×M matrix (ZX matrix B) indicating the release voltage at each of the M observation points, and an N×M matrix (ZX matrix C) indicating the amount of movement at each of the M observation points. It is assumed that each approach voltage is denoted by $fv_a$, each release voltage is denoted by $fv_r$, and each amount of movement is denoted by z, the ZX matrices A, B, and C for one Y-column are expressed as follows.

$$A = \begin{pmatrix} fv_{a\_11} & fv_{a\_12} & fv_{a\_13} & \cdots & fv_{a\_1m} \\ fv_{a\_21} & fv_{a\_22} & fv_{a\_23} & \cdots & fv_{a\_2m} \\ fv_{a\_31} & fv_{a\_32} & fv_{a\_33} & \cdots & fv_{a\_3m} \\ \vdots & \vdots & \vdots & \vdots & \vdots \\ fv_{a\_n1} & fv_{a\_n2} & fv_{a\_n3} & \cdots & fv_{a\_nm} \end{pmatrix} \quad \text{[Equation 1]}$$

$$B = \begin{pmatrix} fv_{r\_11} & fv_{r\_12} & fv_{r\_13} & \cdots & fv_{r\_1m} \\ fv_{r\_21} & fv_{r\_22} & fv_{r\_23} & \cdots & fv_{r\_2m} \\ fv_{r\_31} & fv_{r\_32} & fv_{r\_33} & \cdots & fv_{r\_3m} \\ \vdots & \vdots & \vdots & \vdots & \vdots \\ fv_{r\_n1} & fv_{r\_n2} & fv_{r\_n3} & \cdots & fv_{r\_nm} \end{pmatrix} \quad \text{[Equation 2]}$$

$$C = \begin{pmatrix} z_{11} & z_{12} & z_{13} & \cdots & z_{1m} \\ z_{21} & z_{22} & z_{23} & \cdots & z_{2m} \\ z_{31} & z_{32} & z_{33} & \cdots & z_{3m} \\ \vdots & \vdots & \vdots & \vdots & \vdots \\ z_{n1} & z_{n2} & z_{n3} & \cdots & z_{nm} \end{pmatrix} \quad \text{[Equation 3]}$$

By combining the matrix elements of the ZX matrices A and C corresponding to each other, the relationship between the approach voltage and the amount of movement of the piezoelectric element can be found for the plurality of observation points in one Y-column. By combining the matrix elements of the ZX matrices B and C corresponding to each other, the relationship between the release voltage and the amount of movement of the piezoelectric element can be found for the plurality of observation points in one Y-column.

Assuming that there are 16 Y-columns, each Y-column is composed of 64 observation points, and each of the approach voltage, the release voltage, and the amount of movement at each observation point is represented by 1024 numerical values. In this case, the matrix generation unit 13 generates 16 ZX matrices of 1024 rows×64 columns for each of the approach voltage, the release voltage, and the amount of movement.

The matrix generation unit 13 associates an identifier (for example, a column number) for identifying the Y-column with the ZX matrix for each of the approach voltage, the release voltage, and the amount of movement. By this processing, the surface analysis system 10 can identify to which Y-column each ZX matrix corresponds.

In step S13, the matrix generation unit 13 executes a zero-point adjustment on individual ZX matrices (voltage matrices) indicating detected voltages, i.e., on individual ZX matrices A and B.

The matrix generation unit 13 sets one specific row of the ZX matrix A indicating the approach voltage as a reference row. The matrix generation unit 13 then subtracts the reference row from all of the rows. Therefore, the matrix elements of the reference row are all 0. This subtraction is the zero-point adjustment. The matrix generation unit 13 may set a row corresponding to the highest position in the Z-direction as the reference row. As an example, in a case where the first row is the reference row, the matrix generation unit 13 executes the zero-point adjustment on the ZX matrix A to convert the ZX matrix A into the following ZX matrix A'.

[Equation 4]

$$A' = \begin{pmatrix} 0 & 0 & 0 & \cdots & 0 \\ fv_{a\_21} - fv_{a\_11} & fv_{a\_22} - fv_{a\_12} & fv_{a\_23} - fv_{a\_13} & \cdots & fv_{a\_2m} - fv_{a\_1m} \\ fv_{a\_31} - fv_{a\_11} & fv_{a\_32} - fv_{a\_12} & fv_{a\_33} - fv_{a\_13} & \cdots & fv_{a\_3m} - fv_{a\_1m} \\ \vdots & \vdots & \vdots & \vdots & \vdots \\ fv_{a\_n1} - fv_{a\_11} & fv_{a\_n2} - fv_{a\_12} & fv_{a\_n3} - fv_{a\_13} & \cdots & fv_{a\_nm} - fv_{a\_1m} \end{pmatrix}$$

Similarly, the matrix generation unit 13 sets a specific row of the ZX matrix B indicating the release voltage as a reference row, and subtracts the reference row from all rows. As an example, when the first row is the reference row, the matrix generation unit 13 executes the zero-point adjustment on the ZX matrix B to convert the ZX matrix B into the following ZX matrix B'.

[Equation 5]

$$B' = \begin{pmatrix} 0 & 0 & 0 & \cdots & 0 \\ fv_{r\_21} - fv_{r\_11} & fv_{r\_22} - fv_{r\_12} & fv_{r\_23} - fv_{r\_13} & \cdots & fv_{r\_2m} - fv_{r\_1m} \\ fv_{r\_31} - fv_{r\_11} & fv_{r\_32} - fv_{r\_12} & fv_{r\_33} - fv_{r\_13} & \cdots & fv_{r\_3m} - fv_{r\_1m} \\ \vdots & \vdots & \vdots & \vdots & \vdots \\ fv_{r\_n1} - fv_{r\_11} & fv_{r\_n2} - fv_{r\_12} & fv_{r\_n3} - fv_{r\_13} & \cdots & fv_{r\_nm} - fv_{r\_1m} \end{pmatrix}$$

The matrix generation unit 13 executes such subtraction for all ZX matrices A and B. By the zero-point adjustment (conversion), the voltage corresponding to the highest position in the Z-direction (that is, the voltage corresponding to the maximum value of the amount of movement) is unified to 0 at the plurality of observation points on the Y-column. As a result, the voltage-movement curve of the individual observation points in one Y-column can be evaluated with a common criterion.

Figure 6:
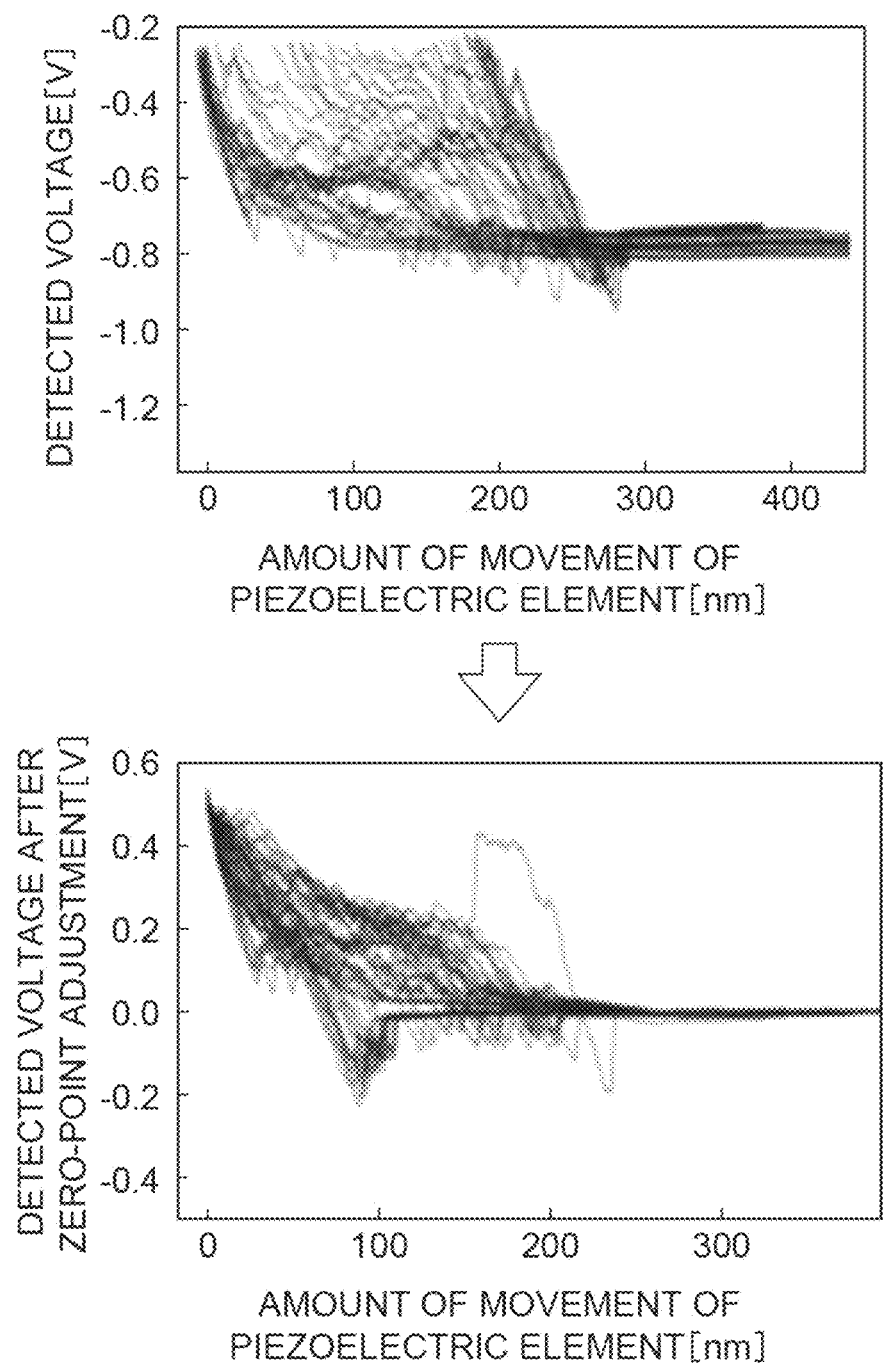
FIG. 6 is a diagram showing an example of zero-point adjustment of a voltage-movement curve.
Figure 7:
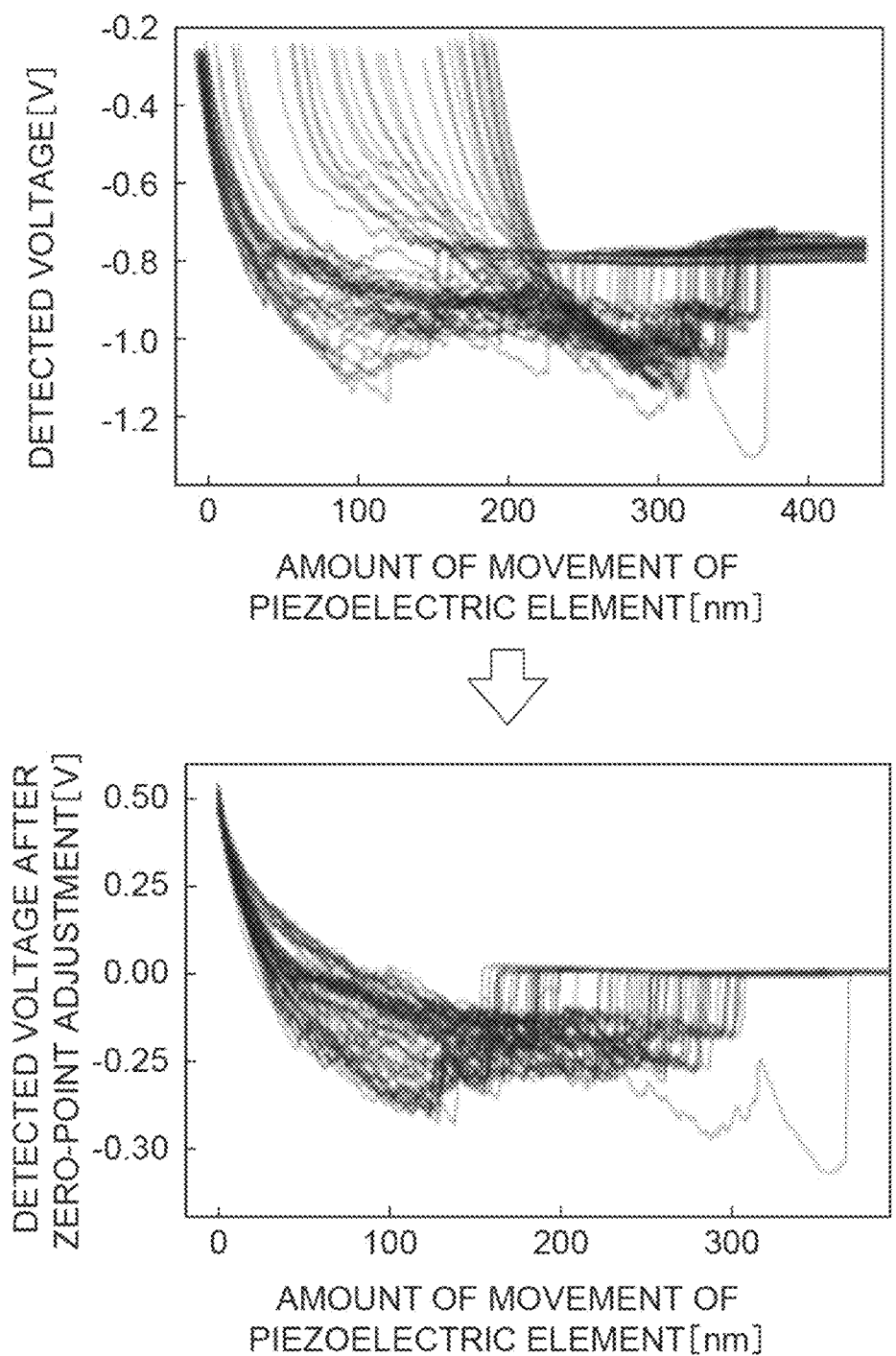
FIG. 7 is a diagram showing another example of zero-point adjustment of a voltage-movement curve.

FIGS. 6 and 7 show examples of zero-point adjustment of the voltage-movement curve. FIG. 6 shows voltage-movement curves for the approach voltage, and FIG. 7 shows voltage-movement curves for the release voltage. Both of these two figures show a plurality of voltage-movement curves corresponding to the plurality of observation points on one Y-column. In both figures, the upper graph shows the voltage-movement curves before the zero-point adjustment, and the lower graph shows the voltage-movement curves after the zero-point adjustment. The horizontal axis of each graph represents the amount of movement of the piezoelectric element, and the vertical axis represents the original detected voltage or the detected voltage after the zero-point adjustment. It is also apparent from FIGS. 6 and 7 that the zero-point adjustment facilitates a comparison of the plurality of voltage-movement curves in one Y-column.

Returning to FIG. 5, in step S14, the calculation unit 12 converts the voltage-movement curve ($F_v$-Z curve) into a force curve ($F_N$-D curve) based on individual ZX matrices. The force curve is a curve ($F_N$-D curve) indicating a relationship between the probe-surface distance D (unit: nm (nanometer)) and a force $F_N$ (unit: nN (nanonewton)) acting on the probe (cantilever) of the AFM 30. Assuming that the amount of deflection of the cantilever is referred to as an amount of spring deflection x (unit: nm), the calculation unit 12 converts the amount of movement Z of the piezoelectric element into the probe-surface distance D according to the equation of D=Z−x. The amount of spring deflection x is given by the equation of x=(voltage $F_v$ of detector)/(optical lever sensitivity). The unit of the optical lever sensitivity is nm/V. The force $F_N$ is obtained by the product of the spring constant k of the cantilever and the amount of spring deflection x, that is, $F_N$=kx.

The calculation unit 12 converts the voltage-movement curve into the force curve for each observation point. By this conversion, the force curves corresponding to the measurement of the sample surface by the AFM 30 (scanning probe microscope) are obtained. The voltage-movement curve at the time of approach at one observation point ($X_i$, $Y_j$) is represented by a set of matrix elements located in the i-th column of the ZX matrix A' of the $Y_j$ column and a set of matrix elements located in the i-th column of the ZX matrix C of the $Y_j$ column. The calculation unit 12 calculates the force curve (i.e., approach curve) at the time of approach at the observation point ($X_i$, $Y_j$) by executing the above calculation using these data. The voltage-movement curve at the time of release at the observation point ($X_i$, $Y_j$) is represented by a set of matrix elements located in the i-th column of the ZX matrix B' of the $Y_j$ column and a set of matrix elements located in the i-th column of the ZX matrix C of the $Y_j$ column. The calculation unit 12 calculates the force curve (i.e., release curve) at the time of release at the observation point ($X_i$, $Y_j$) by executing the above calculation using these data.

The calculation unit 12 calculates the force curve at the time of approach for each observation point of each Y-column. The matrix generation unit 13 generates, for each Y-column, a ZX matrix D indicating the force in the approach and a ZX matrix E indicating the probe-surface distance in the approach, based on that calculation result. Further, the calculation unit 12 calculates the force curve at the time of release for each observation point of each Y-column. The matrix generation unit 13 generates, for each Y-column, a ZX matrix F indicating the force in the release and a ZX matrix G indicating the probe-surface distance in the release, based on that calculation result.

The ZX matrices D and F are examples of a force matrix indicating a change over time in the force acting on the probe at each of the plurality of observation points on the Y-column. The ZX matrices E and G are examples of a distance matrix indicating a change over time in the probe-surface distance at each of the plurality of observation points on the Y-column. A combination of the ZX matrices D and E is an example of the force curve matrix indicating the force curve at the time of approach at each observation point. A combination of the ZX matrices F and G is an example of the force curve matrix indicating the force curve at the time of release at each observation point.

Each force at the time of approach is denoted by $fn_a$, and each voltage at the time of release is denoted by $fn_r$. Each probe-surface distance at the time of approach is denoted by $d_a$, and each probe-surface distance at the time of release is denoted by $d_r$. In this case, the ZX matrices D, E, F, and G for one Y-column are expressed as follows.

$$D = \begin{pmatrix} fn_{a\_11} & fn_{a\_12} & fn_{a\_13} & \cdots & fn_{a\_1m} \\ fn_{a\_21} & fn_{a\_22} & fn_{a\_23} & \cdots & fn_{a\_2m} \\ fn_{a\_31} & fn_{a\_32} & fn_{a\_33} & \cdots & fn_{a\_3m} \\ \vdots & \vdots & \vdots & \vdots & \vdots \\ fn_{a\_n1} & fn_{a\_n2} & fn_{a\_n3} & \cdots & fn_{a\_nm} \end{pmatrix}$$ [Equation 6]

$$E = \begin{pmatrix} d_{a\_11} & d_{a\_12} & d_{a\_13} & \cdots & d_{a\_1m} \\ d_{a\_21} & d_{a\_22} & d_{a\_23} & \cdots & d_{a\_2m} \\ d_{a\_31} & d_{a\_32} & d_{a\_33} & \cdots & d_{a\_3m} \\ \vdots & \vdots & \vdots & \vdots & \vdots \\ d_{a\_n1} & d_{a\_n2} & d_{a\_n3} & \cdots & d_{a\_nm} \end{pmatrix}$$ [Equation 7]

$$F = \begin{pmatrix} fn_{r\_11} & fn_{r\_12} & fn_{r\_13} & \cdots & fn_{r\_1m} \\ fn_{r\_21} & fn_{r\_22} & fn_{r\_23} & \cdots & fn_{r\_2m} \\ fn_{r\_31} & fn_{r\_32} & fn_{r\_33} & \cdots & fn_{r\_3m} \\ \vdots & \vdots & \vdots & \vdots & \vdots \\ fn_{r\_n1} & fn_{r\_n2} & fn_{r\_n3} & \cdots & fn_{r\_nm} \end{pmatrix}$$ [Equation 8]

$$G = \begin{pmatrix} d_{r\_11} & d_{r\_12} & d_{r\_13} & \cdots & d_{r\_1m} \\ d_{r\_21} & d_{r\_22} & d_{r\_23} & \cdots & d_{r\_2m} \\ d_{r\_31} & d_{r\_32} & d_{r\_33} & \cdots & d_{r\_3m} \\ \vdots & \vdots & \vdots & \vdots & \vdots \\ d_{r\_n1} & d_{r\_n2} & d_{r\_n3} & \cdots & d_{r\_nm} \end{pmatrix}$$ [Equation 9]

The matrix generation unit 13 associates an identifier (for example, a column number) for identifying the Y-column with each of the ZX matrices D, E, F, and G. By this processing, the surface analysis system 10 can identify to which Y-column each ZX matrix corresponds.

In step S15, the matrix generation unit 13 executes the zero-point adjustment on the individual ZX matrices (distance matrices) indicating the probe-surface distances, i.e., individual ZX matrices E and G.

The matrix generation unit 13 sets, in each column of the ZX matrix E (i.e., for each X-position), the minimum value of the column as a reference value. The matrix generation unit 13 then subtracts the reference value from all matrix elements of that column. Therefore, the matrix element of the reference value becomes 0. This subtraction is the zero-point adjustment. Assuming that the minimum value in the m-th column is denoted by $da_{min\_m}$, the matrix generation unit 13 executes the zero-point adjustment on the ZX matrix E to convert the ZX matrix E into the following ZX matrix E'.

$$E' = \begin{pmatrix} d_{a\_11} - da_{min\_1} & d_{a\_12} - da_{min\_2} & d_{a\_13} - da_{min\_3} & \cdots & d_{a\_1m} - da_{min\_m} \\ d_{a\_21} - da_{min\_1} & d_{a\_22} - da_{min\_2} & d_{a\_23} - da_{min\_3} & \cdots & d_{a\_2m} - da_{min\_m} \\ d_{a\_31} - da_{min\_1} & d_{a\_32} - da_{min\_2} & d_{a\_33} - da_{min\_3} & \cdots & d_{a\_3m} - da_{min\_m} \\ \vdots & \vdots & \vdots & \vdots & \vdots \\ d_{a\_n1} - da_{min\_1} & d_{a\_n2} - da_{min\_2} & d_{a\_n3} - da_{min\_3} & \cdots & d_{a\_nm} - da_{min\_m} \end{pmatrix}$$ [Equation 10]

Similarly, the matrix generation unit 13 sets, for each column of the ZX matrix G, the minimum value of the column as a reference value, and subtracts the reference value from all matrix elements of that column. Assuming that the minimum value of the m-th column is denoted by $dr_{min\_m}$, the matrix generation unit 13 executes the zero-point adjustment on the ZX matrix G to convert the ZX matrix G into the following ZX matrix G'.

$$G' = \begin{pmatrix} d_{r\_11} - dr_{min\_1} & d_{r\_12} - dr_{min\_2} & d_{r\_13} - dr_{min\_3} & \cdots & d_{r\_1m} - dr_{min\_m} \\ d_{r\_21} - dr_{min\_1} & d_{r\_22} - dr_{min\_2} & d_{r\_23} - dr_{min\_3} & \cdots & d_{r\_2m} - dr_{min\_m} \\ d_{r\_31} - dr_{min\_1} & d_{r\_32} - dr_{min\_2} & d_{r\_33} - dr_{min\_3} & \cdots & d_{r\_3m} - dr_{min\_m} \\ \vdots & \vdots & \vdots & \vdots & \vdots \\ d_{r\_n1} - dr_{min\_1} & d_{r\_n2} - dr_{min\_2} & d_{r\_n3} - dr_{min\_3} & \cdots & d_{r\_nm} - dr_{min\_m} \end{pmatrix}$$ [Equation 11]

For both ZX matrices E and G, the row in which the minimum value (reference value) is located may be different for each column (each X-position). Therefore, unlike the zero-point adjustment for the ZX matrices A and B, in the ZX matrices E and G, all matrix elements of one row do not necessarily become 0.

The matrix generation unit 13 executes such a subtraction for all ZX matrices E and G. By this zero-point adjustment (conversion), the minimum value of the probe-surface distance is unified to 0 at the plurality of observation points on the Y-column. As a result, each force curve (force, and probe-surface distance) of each observation point in one Y-column can be evaluated with a common criterion.

In step S16, the calculation unit 12 calculates the physical quantity based on at least part of the ZX matrix related to the force curve (i.e., at least part of the ZX matrices D, E', F, and G'). The type of physical quantity to be calculated is not limited, and the ZX matrix to be used is also not limited, accordingly.

Figure 8:
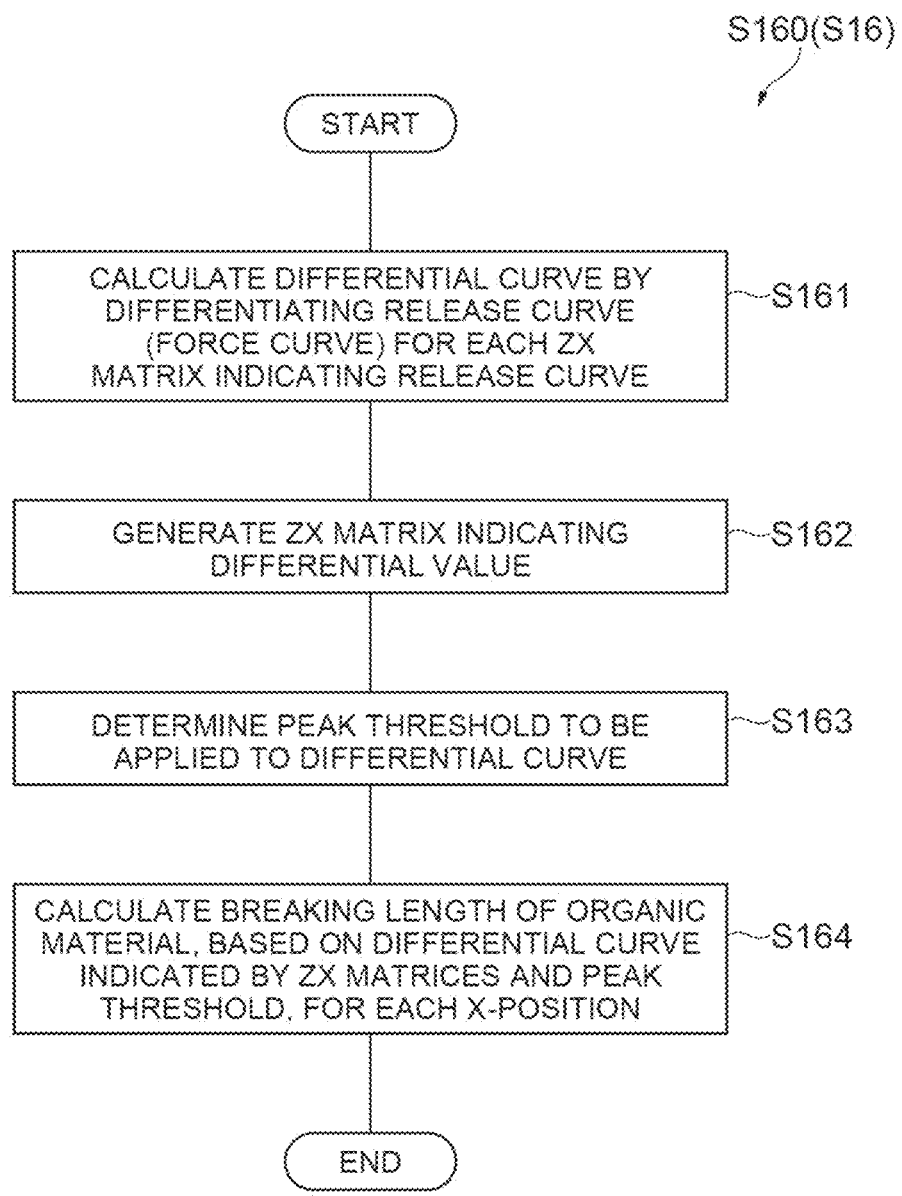
FIG. 8 is a flowchart showing an example process of calculating a breaking length of an organic material.

As an example of the calculation of the physical quantity, a process of calculating the breaking length of the organic material will be described with reference to FIG. 8. FIG. 8 is a flowchart showing an example of the processing as a processing flow S160. The processing flow S160 is at least part of step S16. In the present disclosure, the breaking length refers to a distance from the sample surface to the probe when an organic material having attached to the probe of the scanning probe microscope (for example, the AFM 30) by an attractive force is separated from the probe. The breaking length is an example of the physical quantity of the sample surface or organic material. By obtaining a distribution of breaking lengths in the Y-column or the observation point group, it is possible to determine the presence or type of the organic material on the sample surface.

In step S161, the calculation unit 12 calculates a differential curve by differentiating the release curve (force curve) for each ZX matrix indicating the release curve. Specifically, the calculation unit 12 calculates a differential curve by calculating a first-order differentiation of the force curve (force $F_N$) according to the probe-surface distance D (i.e., $dF_N/dD$), for each observation point indicated by each ZX matrix.

Figure 9:
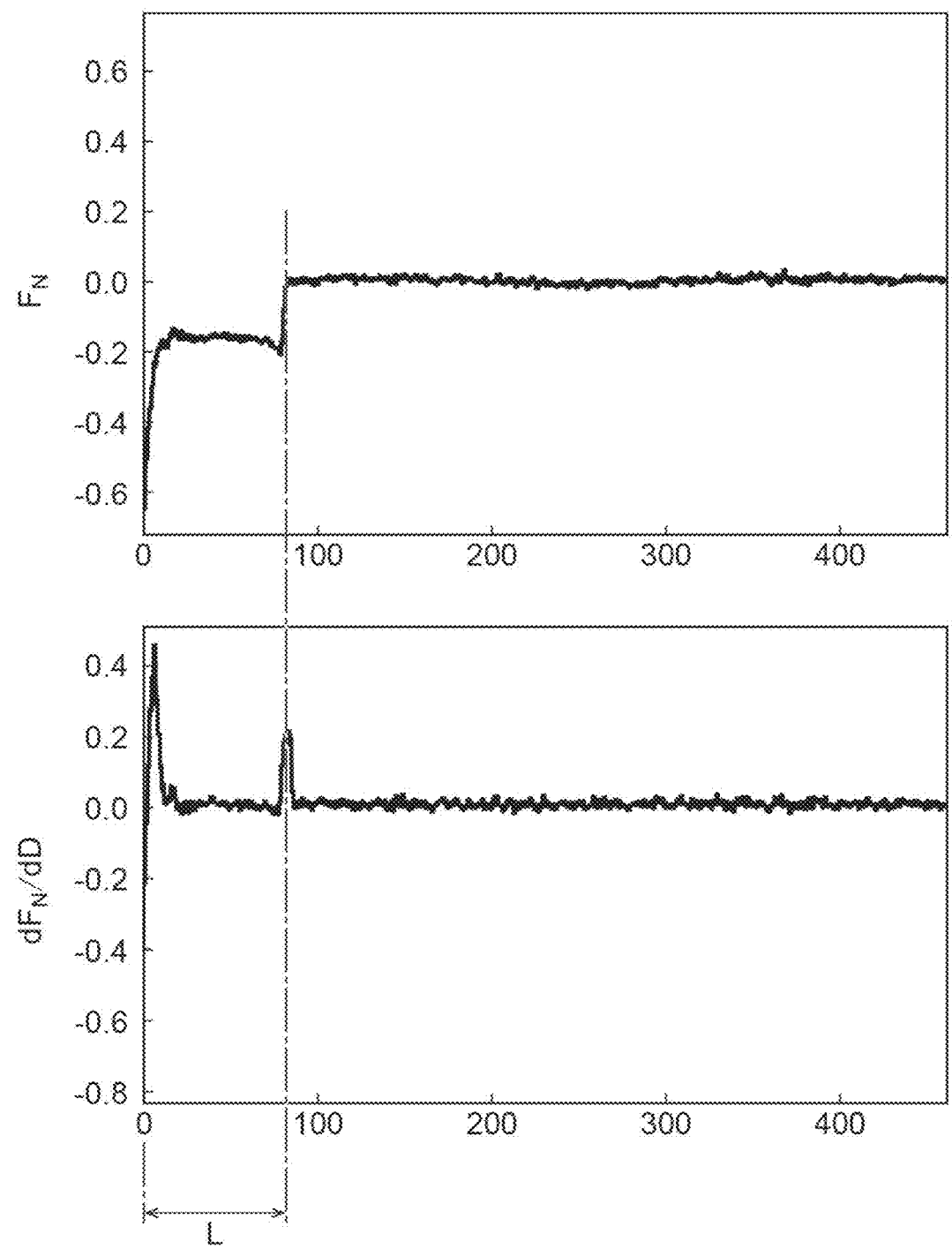
FIG. 9 is a diagram showing an example of a force curve and a corresponding differential curve.
Figure 10:
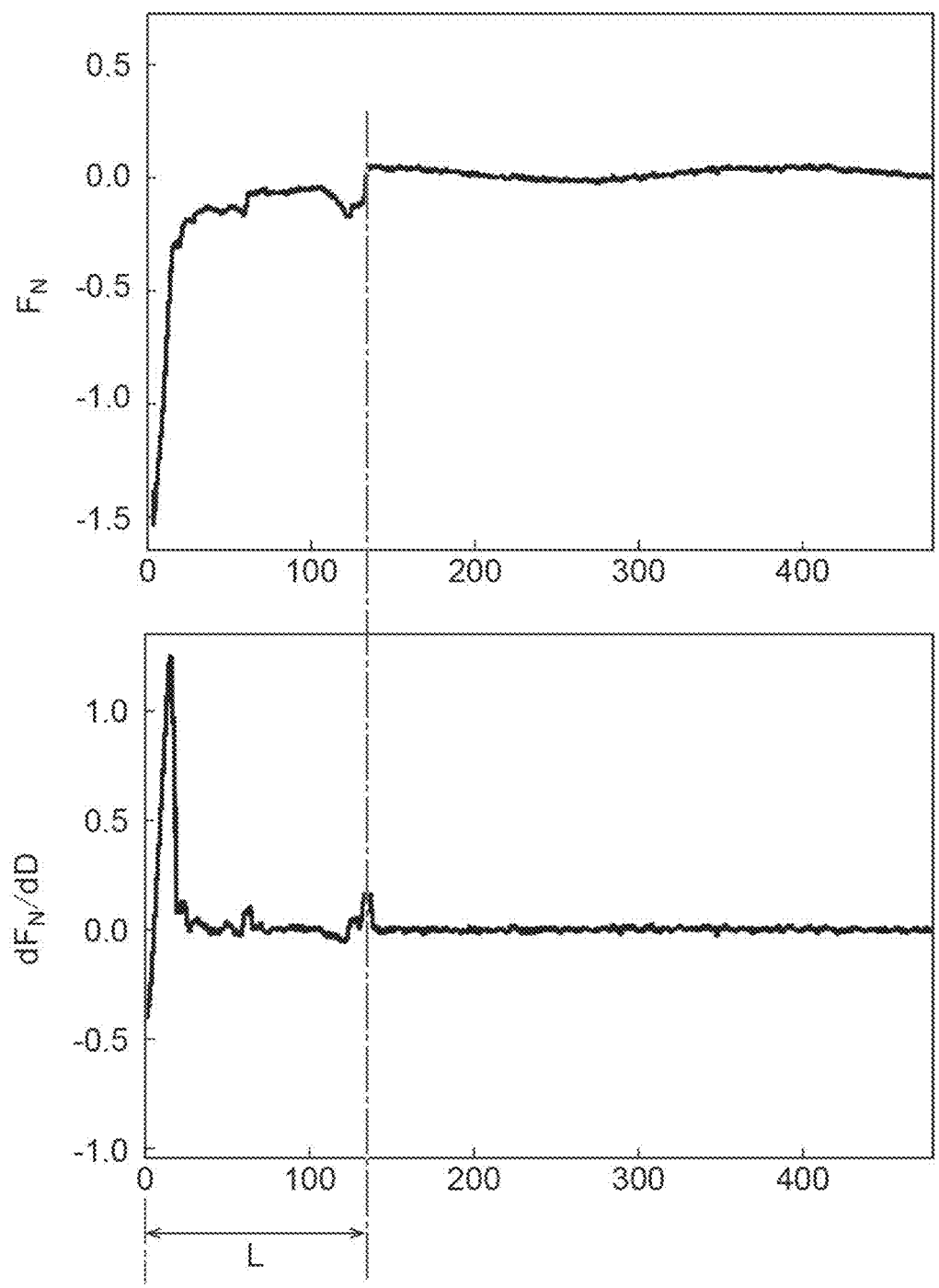
FIG. 10 is a diagram showing an example of a force curve and a corresponding differential curve.

FIGS. 9 and 10 are diagrams showing examples of a release curve and a corresponding differential curve at one observation point. In both figures, the upper graph represents the release curve (force curve), the vertical axis represents the force $F_N$, and the horizontal axis represents the probe-surface distance D. The lower graph shows the differential curve, the vertical axis represents $dF_N/dD$, and the horizontal axis represents the probe-surface distance D.

Each the calculation unit 12 differentiates the release curve (force curve) for each observation point. The release curve at one observation point $(X_i, Y_j)$ is represented by a set of matrix elements located in the i-th column of the ZX matrix F of the $Y_j$ column and a set of matrix elements located in the i-th column of the ZX matrix G' of the $Y_j$ column. The calculation unit 12 calculates the differential curve at the observation point $(X_i, Y_j)$ by executing the above-mentioned first-order differentiation using those data. The calculation unit 12 calculates the differential curve for each observation point of each Y-column.

In step S162, the matrix generation unit 13 generates a ZX matrix H (differential value matrix) indicating the calculated differential value $dF_N/dD$ for each Y-column. Assuming that each differential value $dF_N/dD$ is denoted by $dif\_fn_r$, the ZX matrix H for one Y-column is expressed as follows.

$$H = \begin{pmatrix} dif\_fn_{r\_11} & dif\_fn_{r\_12} & dif\_fn_{r\_13} & \cdots & dif\_fn_{r\_1m} \\ dif\_fn_{r\_21} & dif\_fn_{r\_22} & dif\_fn_{r\_23} & \cdots & dif\_fn_{r\_2m} \\ dif\_fn_{r\_31} & dif\_fn_{r\_32} & dif\_fn_{r\_33} & \cdots & dif\_fn_{r\_3m} \\ \vdots & \vdots & \vdots & \vdots & \vdots \\ dif\_fn_{r\_n1} & dif\_fn_{r\_n2} & dif\_fn_{r\_n3} & \cdots & dif\_fn_{r\_nm} \end{pmatrix}$$ [Equation 12]

The differential curve of the release curve at one observation point $(X_i, Y_j)$ is represented by a set of matrix elements located in the i-th column of the ZX matrix H of the $Y_j$ column and a set of matrix elements located in the i-th column of the ZX matrix G' of the $Y_j$ column.

The matrix generation unit 13 associates an identifier (for example, a column number) for identifying the Y-column with each ZX matrix H. By this processing, the surface analysis system 10 can identify to which Y-column each ZX matrix H corresponds.

In step S163, the calculation unit 12 determines a peak threshold to be applied to the differential curve. In the present disclosure, a peak refers to a maximum value in a needle-like portion in which a differential value stands out from other portions, and corresponds to a place where a force applied to the probe (cantilever) instantaneously largely changes. The peak threshold is a value set to identify the peak in the differential curve. The peak threshold is a common value among the observation point group set on one sample. A method of setting the peak threshold is not limited. In one example, the calculation unit 12 may set the peak threshold based on a signal-to-noise ratio (S/N) of the differential curve, and for example, the peak threshold may be set to 5 dB (decibels). The calculation unit 12 may calculate a statistical value (for example, mean square error) of the noise in a section, in which the organic material is not attached to the probe, of the differential curve, as a noise level serving as a base of the S/N.

In step S164, the calculation unit 12 calculates the breaking length of the organic material, based on the differential curve indicated by the ZX matrices G' and H and the peak threshold, for each X-position (that is, each observation point).

The calculation unit 12 is calculated a distance from the sample surface to the farthest peak as the breaking length of the organic material. The "farthest peak" refers to the peak farthest from the sample surface. The calculation unit 12 identifies each of one or more of the needle-like portions having a value greater than the peak threshold in the differential curve, as a peak. A break, which is a phenomenon in which the organic material is separated from the probe, may occur a plurality of times at one observation point. Accordingly, a force applied to the probe may be instantaneously greatly changed at each break. Thus, there may be multiple peaks at one observation point. The calculation unit 12 therefore identifies, for each observation point, the peak farthest from the sample surface as the farthest peak. The calculation unit 12 calculates a distance from the sample surface to the farthest peak as the breaking length of the organic material. The distance L in FIGS. 9 and 10 indicates the breaking length. By obtaining the distance from the sample surface to the farthest peak as the breaking length, it is possible to know the presence of an organic material having a length equal to or longer than the breaking length.

In the graphs of the differential curves shown in FIGS. 9 and 10, the sample surface is expressed as D=0. In the ZX matrix G', the sample surface corresponds to a position where a matrix element is 0 in the column corresponding to the observation point. The calculation unit 12 identifies the position of each peak by referring to the ZX matrices G' and H. Specifically, the calculation unit 12 identifies a position (i, j) of a matrix element larger than the peak threshold for a certain column of the ZX matrix H, and identifies a matrix element at the position (i, j) of the ZX matrix G' as a peak. The calculation unit 12 may identify one or more peaks. The calculation unit 12 acquires the maximum value of the identified peaks as the farthest peak. Since the position where the matrix element is 0 indicates the sample surface in the ZX matrix G', the calculation unit 12 may recognize the acquired maximum value as the breaking length as it is.

The calculation unit 12 refers to the ZX matrices G' and H corresponding to a certain Y-column, and calculates the breaking length at each of the plurality of observation points on the Y-column. The calculation unit 12 executes the same process for all Y-columns to obtain the distribution of breaking lengths in the observation point group.

Referring back to FIG. 5, in step S17, the output unit 14 outputs a calculation result with respect to the observation point group (for example, a result including the breaking length at each observation point) as analysis data. A method for outputting the analysis data is not limited. For example, the output unit 14 may display the analysis data on a monitor, store the analysis data into any storage such as a database, transmit the analysis data to another computer or device, or print the analysis data. A data structure and expression format of the analysis data are also not limited. For example, the analysis data may be represented by numerical values, text, graphs, computer graphics, or any combination of these techniques.

Figure 11:
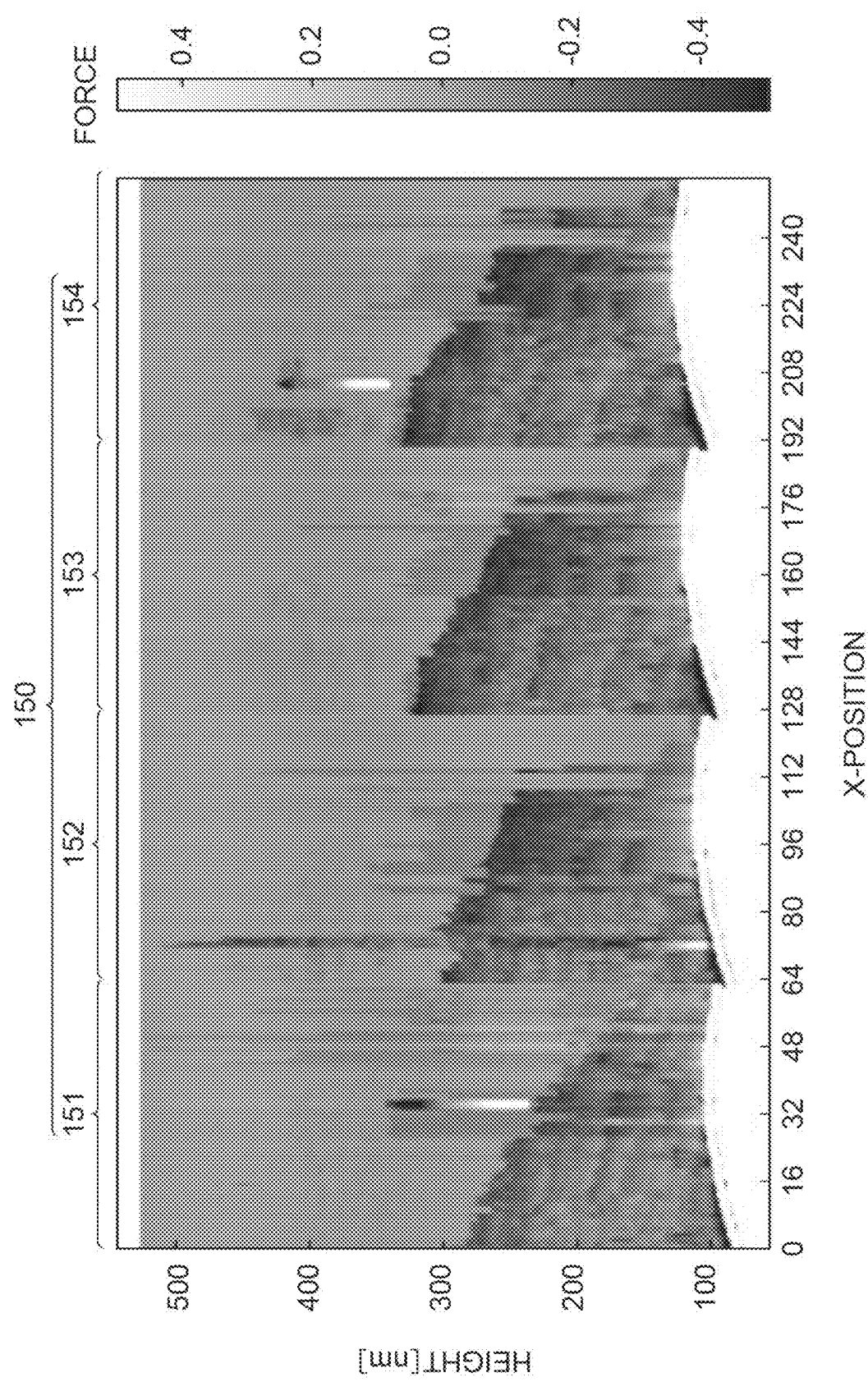
FIG. 11 is a diagram showing an example analysis image representing a distribution of physical quantities in a plurality of Y-columns.

Various examples of outputting the analysis data are shown below. FIG. 11 is a diagram showing an example of an analysis image representing a distribution of physical quantities in a plurality of Y-columns. For example, the output unit 14 generates, for each of the plurality of Y-columns, an intermediate image indicating the distribution of physical quantities corresponding to the plurality of observation points on the Y-column. Then, the output unit 14 generates one analysis image by connecting a plurality of the generated intermediate images along one direction and outputs the analysis data including the analysis image. In the example of FIG. 11, the output unit 14 generates intermediate images 151-154 for four Y-columns, and connects the intermediate image 151-154 along the lateral direction to generate an analysis image 150. One Y-column is composed of 64 observation points. Accordingly, the analysis image 150 indicates a distribution of physical quantities in a range covered by 256 (=64×4) observation points. In the analysis image 150, the distribution of force acting on the probe is expressed in gray scale on a graph in which the horizontal axis represents an X-position and the vertical axis represents a height. The height is a value obtained by subtracting the amount of spring deflection from the amount of movement of the piezoelectric element, and is the probe-surface distance without the zero-point adjustment. In the analysis image 150, white portions ranging in height from 0 to about 100 nm indicate repulsive force, which corresponds to the shape of the sample. The boundary between the white portion and the black portion corresponds to the sample surface. The boundary between the black portion and the gray portion corresponds to a time point at which the organic material is completely separated from the probe. Therefore, the distance between the two boundaries in the vertical axis direction (in other words, the length of the black portion in the vertical axis direction) corresponds to the breaking length.

Figure 12:
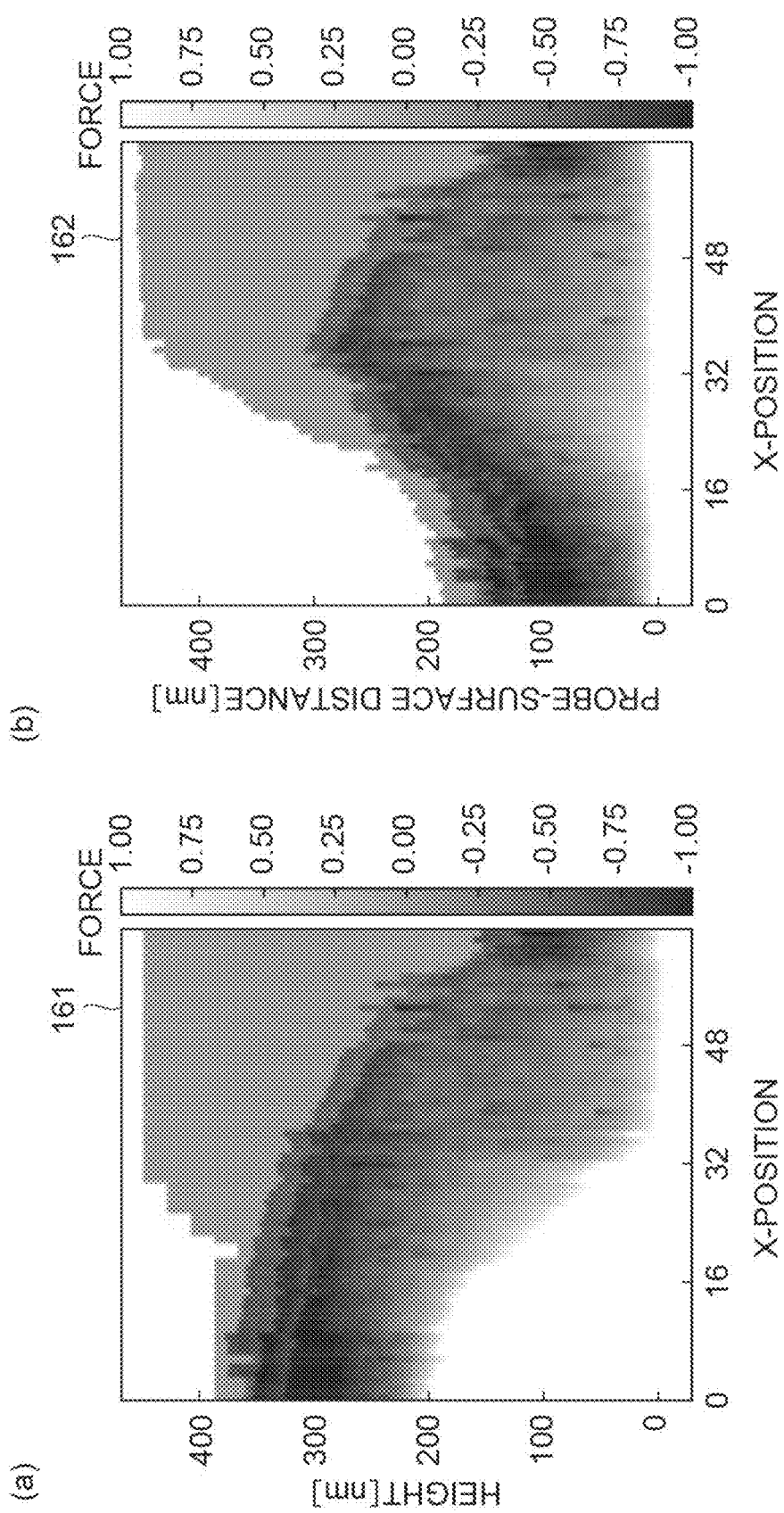
FIG. 12 is a diagram showing an example analysis image representing a distribution of physical quantities in one Y-column.

FIG. 12 is a diagram showing an example of an analysis image representing a distribution of physical quantities in one Y-column. The examples (a) and (b) of FIG. 12 both show the distribution of physical quantities corresponding to a plurality of observation points on the Y-column, and are therefore similar to the intermediate image 151-154. A boundary between the white portion and the black portion corresponds to the sample surface, and a boundary between the black portion and the gray portion corresponds to a time point at which the organic material is completely separated from the probe. The length of the black portion in the vertical axis direction corresponds to the breaking length. The vertical axis of an analysis image 161 in the example (a) indicates the height (probe-surface distance without the zero-point adjustment). On the other hand, the vertical axis of an analysis image 162 in the example (b) indicates the probe-surface distance (result of the zero-point adjustment). In the analysis image 162, since the shape of sample is removed by the zero-point adjustment and the position of sample surface is aligned in the entire Y-column, the position of sample surface is flatly expressed along the horizontal axis direction. Thus, the analysis image 162 shows the distribution of physical quantities (e.g., breaking length) in the Y-column more clearly than the analysis image 161.

Figure 13:
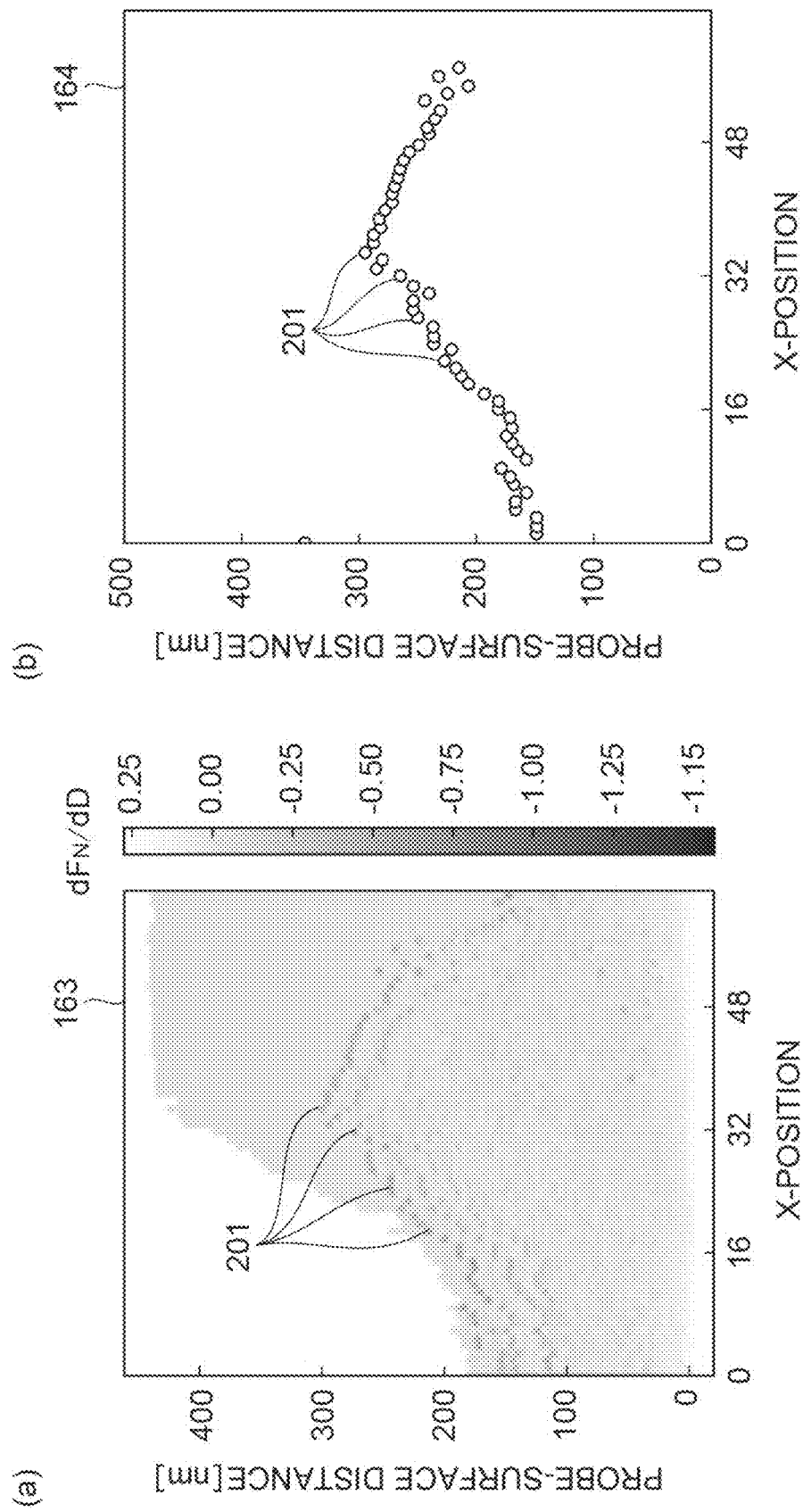
FIG. 13 is a diagram showing an example analysis image representing a distribution of physical quantities in one Y-column.

FIG. 13 is a diagram showing another example of an analysis image representing a distribution of physical quantities in one Y-column. The examples (a) and (b) of FIG. 13 both show the distribution of physical quantities corresponding to a plurality of observation points on the Y-column, and are therefore similar to the intermediate image 151-154. An analysis image 163 in the example (a) represents the differential curve at each observation point in gray scale, with the farthest peak in the differential curve represented by a point 201. An analysis image 164 in the example (b) represents only a set of the points 201. In both the analysis images 163 and 164, the length from the zero-position to the point 201 along the vertical axis is the breaking length. In the example of FIG. 13, since the zero-point adjustment of the probe-surface distance is executed, the position of the sample surface is expressed flatly along the horizontal axis direction in both the analysis images 163 and 164.

Figure 14:
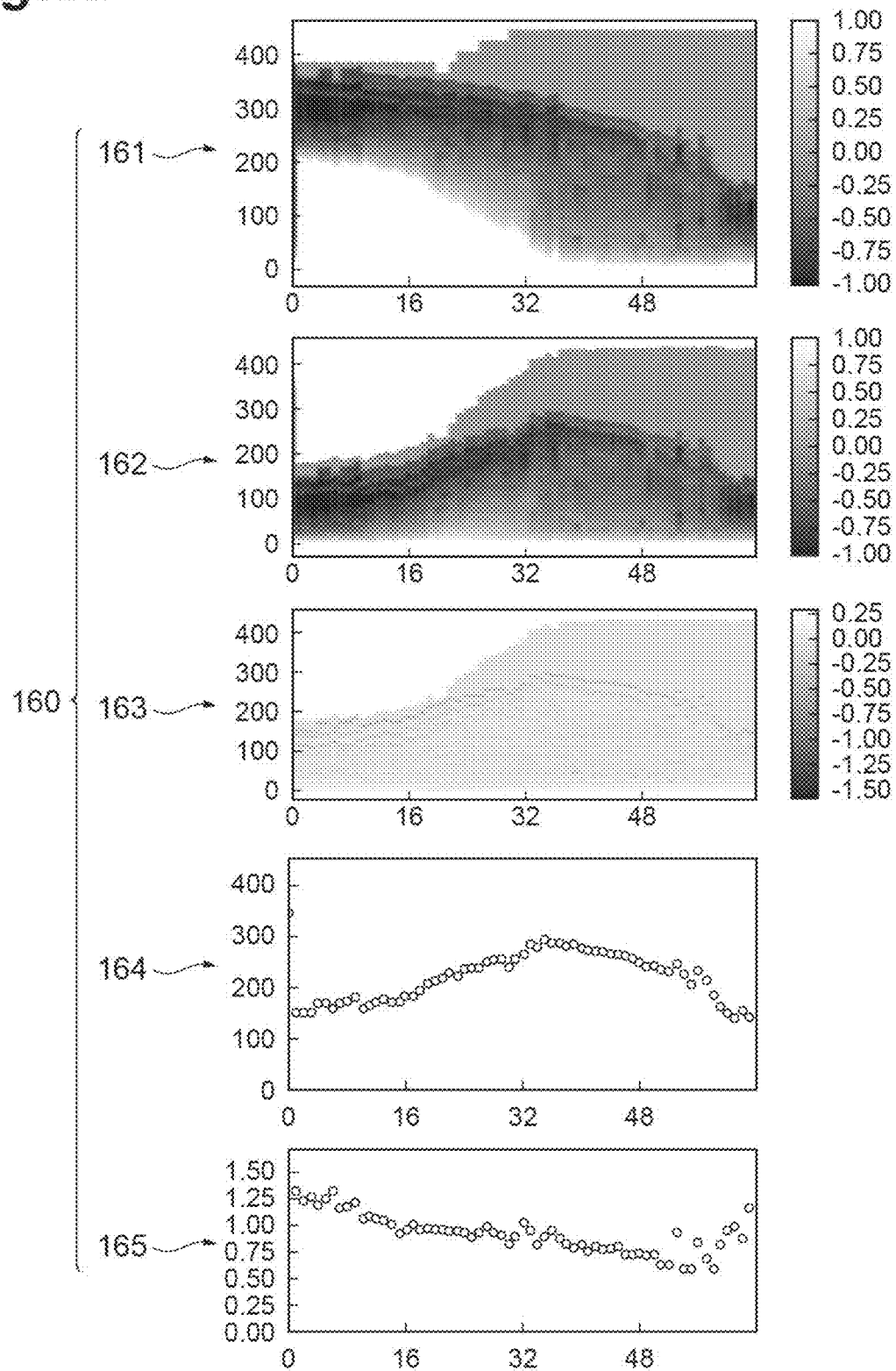
FIG. 14 is a diagram showing an example of displaying a plurality of types of analysis images at once.

FIG. 14 is a diagram showing an example of displaying a plurality of types of analysis images at once. In this example, the output unit 14 displays a screen 160 including five types of analysis images 161-165. The analysis images 161-164 is the same as those shown in FIGS. 12 and 13. The analysis image 165 is a graph representing a distribution of maximum breaking forces (adhesions) in one Y-column, with the horizontal axis representing the X-position and the vertical axis representing the maximum breaking force (unit: nN). As described above, the maximum breaking force can be obtained in the force mode of the AFM 30.

The output unit 14 may output analysis data including any physical quantity. Other examples of the physical quantities include elastic modulus, gradient, deformation, energy dissipation, amount of work at the time of approach, amount of work at the time of release, and noise information.

[Program]

A surface analysis program for implementing the surface analysis system 10 includes program code for causing a computer system to function as the acquisition unit 11, the calculation unit 12, the matrix generation unit 13, and the output unit 14. A surface analysis program for causing a computer system to function as the surface analysis system 10 includes program codes for causing the computer system to function as the acquisition unit 11, the calculation unit 12, the matrix generation unit 13, and the output unit 14. A program language for creating the surface analysis program is not limited, and for example, the program language may be Python, Java (registered trademark), or C++. The surface analysis program may be provided after being non-temporarily recorded in a tangible recording medium such as a CD-ROM, a DVD-ROM, or a semiconductor memory. Alternatively, the surface analysis program may be provided via a communication network as data signals superimposed on a carrier wave. The provided surface analysis program is stored, for example, into the auxiliary storage unit 103. The processor 101 reads the surface analysis program from the auxiliary storage unit 103 and executes the program, thereby realizing each functional element described above.

[Effects]

As described above, a surface analysis method according to an aspect of the present disclosure includes: acquiring a force curve corresponding to measurement of a sample surface by a scanning probe microscope, the scanning probe microscope performing the measurement at each of an observation point group on the sample surface by, while reciprocating a probe with respect to a stage along a X-direction along a horizontal surface, moving the probe in one direction with respect to the stage along a Y-direction which is along the horizontal surface and orthogonal to the X-direction; calculating a physical quantity of an organic material forming the sample surface based on the force curve, for each of the observation point group; and outputting analysis data indicating the physical quantity of each of the observation point group. The acquiring the force curve includes acquiring, for each of at least one Y-column extending along the X-direction, the force curve at each of a plurality of observation points on the Y-column. The calculating the physical quantity includes: generating, for each of the at least one Y-column, a force curve matrix indicating the force curve at each of the plurality of observation points on the Y-column; and calculating, for each of the at least one Y-column, the physical quantity at each of the plurality of observation points using the force curve matrix.

A surface analysis system according to an aspect of the present disclosure includes at least one processor. The at least one processor is configured to execute: acquiring a force curve corresponding to measurement of a sample surface by a scanning probe microscope, the scanning probe microscope performing the measurement at each of an observation point group on the sample surface by, while reciprocating a probe with respect to a stage along a X-direction along a horizontal surface, moving the probe in one direction with respect to the stage along a Y-direction which is along the horizontal surface and orthogonal to the X-direction; calculating a physical quantity of an organic material forming the sample surface based on the force curve, for each of the observation point group; and outputting analysis data indicating the physical quantity of each of the observation point group. In the acquiring the force curve, the at least one processor is configured to acquire, for each of at least one Y-column extending along the X-direction, the force curve at each of a plurality of observation points on the Y-column. In the calculating the physical quantity, the at least one processor is configured to: generate, for each of the at least one Y-column, a force curve matrix indicating the force curve at each of the plurality of observation points on the Y-column; and calculate, for each of the at least one Y-column, the physical quantity at each of the plurality of observation points using the force curve matrix.

A surface analysis program according to an aspect of the present disclosure causes a computer to execute: acquiring a force curve corresponding to measurement of a sample surface by a scanning probe microscope, the scanning probe microscope performing the measurement at each of an observation point group on the sample surface by, while reciprocating a probe with respect to a stage along a X-direction along a horizontal surface, moving the probe in one direction with respect to the stage along a Y-direction which is along the horizontal surface and orthogonal to the X-direction; calculating a physical quantity of an organic material forming the sample surface based on the force curve, for each of the observation point group; and outputting analysis data indicating the physical quantity of each of the observation point group. The acquiring the force curve includes acquiring, for each of at least one Y-column extending along the X-direction, the force curve at each of a plurality of observation points on the Y-column. The calculating the physical quantity includes: generating, for each of the at least one Y-column, a force curve matrix indicating the force curve at each of the plurality of observation points on the Y-column; and calculating, for each of the at least one Y-column, the physical quantity at each of the plurality of observation points using the force curve matrix.

In these aspects, the plurality of force curves corresponding to the plurality of observation points arranged in a row along the X-direction are represented by a matrix. By using this matrix, the physical quantities of the organic material at the plurality of observation points can be calculated at one time. As a result, the organic material formed on the surface of the sample can be analyzed more efficiently. In a scanning probe microscope such as an AFM, a large amount of data related to the force curve is obtained for each observation point. Therefore, the whole of the observation point group has quite a large amount of data. In a case where the physical quantity is calculated for each observation point, since the process is repeated by the number of observation points, the calculation time increases. On the other hand, in a case where the enormous amount of data is expressed by a third-order tensor corresponding to the X, Y, and Z-directions, the calculation procedure becomes quite complicated. By expressing such enormous amount of data by a matrix and processing the matrix, the physical quantity of the organic material can be efficiently analyzed.

In the surface analysis method according to another aspect, the generating the force curve matrix may include generating, as the force curve matrix, a combination of a force matrix indicating a change over time in a force acting on the probe at each of the plurality of observation points and a distance matrix indicating a change over time in a probe-surface distance at each of the plurality of observation points, the probe-surface distance being a distance between the probe and the sample surface. By expressing the force curve with the force matrix and the distance matrix, it is possible to calculate the physical quantities at once without complicating the configuration of the matrix.

In the surface analysis method according to another aspect, the generating the force curve matrix may include converting the distance matrix such that a minimum value of the probe-surface distance is unified to 0 among the plurality of observation points. By this conversion, the position of the sample surface is unified to 0 at the plurality of observation points. This means that the influence of the shape of the sample on the probe-surface distance is eliminated. Therefore, the probe-surface distance can be more easily compared among the plurality of observation points by the conversion (zero-point adjustment).

In a surface analysis method according to another aspect, the at least one Y-column may include a plurality of the Y-columns the outputting the analysis data may include: generating an intermediate image indicating a distribution of the physical quantity corresponding to the plurality of observation points, for each of the plurality of Y-columns; generating one analysis image by connecting a plurality of the intermediate images along one direction; and output the analysis data including the analysis image. The analysis image expresses the distribution of physical quantity in the three-dimensional space not by a three-dimensional image but by a two-dimensional image. Since the physical quantities of each Y-column are displayed side by side on the two-dimensional plane, the distribution of physical quantities can be presented to a user in an easy-to-understand manner.

In the surface analysis method according to another aspect, the calculating the physical quantity at each of the plurality of observation points may include: calculating a differential curve by calculating a first-order differentiation of the force curve according to a probe-surface distance which is a distance between the probe and the sample surface, for each of a plurality of the force curves indicated by the force curve matrix; and calculating, for each of the plurality of observation points, a distance from the sample surface to a farthest peak as a breaking length of the organic material forming the sample surface, based on the differential curve corresponding to the observation point. By calculating a first-order differentiation of the force curve according to the probe-surface distance, a differential curve indicating a portion (peak) in which the force instantaneously greatly changes can be obtained. Then, based on the differential curve, the distance from the surface to the farthest peak is obtained as the breaking length of the organic material forming the surface of the sample. Since the breaking length indicating characteristics of the organic material is obtained by such a series of processes, the organic material formed on the surface of the sample can be analyzed in more detail.

In the surface analysis method according to another aspect, the acquiring the force curve at each of the plurality of observation points on the Y-column may include: acquiring, for each of the plurality of observation points, a voltage-movement curve indicating a relationship between an amount of movement of a piezoelectric element of the scanning probe microscope and a voltage of a detector of the scanning probe microscope; and converting the voltage-movement curve into the force curve for each of the plurality of observation points. In a case where the voltage-movement curve is used as it is, an error occurs in the breaking length by the amount of deflection of the cantilever of the scanning probe microscope (for example, the breaking length is excessively evaluated by the amount of deflection). The breaking length can be more accurately calculated by converting the voltage-movement curve into the force curve.

In the surface analysis method according to another aspect, the converting the voltage-movement curve into the force curve may include: calculating a probe-surface distance which is a distance between the probe and the sample surface by subtracting an amount of spring deflection of a cantilever having the probe from the amount of movement; and calculating a force acting on the probe by multiplying a spring constant of the cantilever by the amount of spring deflection. By calculating the probe-surface distance and force in such a manner, the force curve can be obtained by simple calculation.

In the surface analysis method according to another aspect, the acquiring the voltage-movement curve may include: generating a voltage matrix indicating a change over time in the voltage at each of the plurality of observation points; and converting the voltage matrix such that the voltage corresponding to a maximum value of the amount of movement is unified to 0. The conversion (zero-point adjustment) unifies the voltage criterion among the plurality of observation points, and as a result, the voltage-movement curve of each observation point can be evaluated by the common criterion. Furthermore, it is possible to compare the force curves (or a distribution of force) among multiple observation points more easily.

In the surface analysis method according to another aspect, the sample surface may be a surface of powder not held by a carrier. In this case, the organic material formed on the surface of the powder can be analyzed more efficiently.

[Modifications]

Detailed explanations has been made based on embodiments of the present disclosure. The present disclosure is however not limited to the embodiments described above. The present disclosure may be variously modified within a range not departing from the gist thereof.

In the above embodiments, the surface analysis system 10 converts the voltage-movement curve into the force curve, but this conversion process is optional. For example, the surface analysis system may acquire data of a force curve calculated by a scanning probe microscope or another computer system.

In the above-described embodiments, the surface analysis system 10 identifies the farthest peak using the peak threshold, but a method for specifying the farthest peak is not limited thereto. The surface analysis system may calculate the breaking length by identifying the farthest peak using other techniques.

In the above embodiment, the surface analysis system 10 executes the zero-point adjustment on the matrix for the probe-surface distance and the matrix for the detected voltage, but the zero-point adjustment is not an essential process.

In the present disclosure, "at least one processor executes a first process, executes a second process, . . . , executes an n-th process" or an expression corresponding thereto indicates a concept including a case where an execution subject (that is, processor) of n pieces of processing from the first processing to the n-th processing changes in the middle. That is, that expression indicates a concept including both a case where all of the n pieces of processing are executed by the same processor and a case where the processor changes in any policy among the n pieces of processing.

The procedure of the method executed by at least one processor is not limited to examples in the above embodiments. For example, some of the above-described steps (processes) may be omitted, or the steps may be executed in a different order. Any two or more of the above-described steps may be combined, or part of the steps may be modified or deleted. Alternatively, other steps may be executed in addition to the above-described steps.

In a case where a magnitude relationship between two numerical values is compared in a computer system or a computer, either of two criteria of "equal to or greater than" and "greater than" may be used, and either of two criteria of "equal to or less than" and "less than" may be used. Such selection of the criterion does not change the technical meaning of the process of comparing the magnitude relationship between two numerical values.

REFERENCE SIGNS LIST

10: surface analysis system, 11: acquisition unit, 12: calculation unit, 13: matrix generation unit, 14: output unit, 30: AFM (scanning probe microscope), 31: cantilever, 32: probe, 33: stage, 34: piezoelectric element, 40: sample, 41: surface, 50: observation point group, 501-564: observation point.

The invention claimed is:

1. A surface analysis method comprising:
   acquiring a force curve corresponding to measurement of a sample surface by a scanning probe microscope, the scanning probe microscope performing the measurement at each of an observation point group on the sample surface by, while reciprocating a probe with respect to a stage along a X-direction along a horizontal surface, moving the probe in one direction with respect to the stage along a Y-direction which is along the horizontal surface and orthogonal to the X-direction;
   calculating a physical quantity of an organic material forming the sample surface based on the force curve, for each of the observation point group; and
   outputting analysis data indicating the physical quantity of each of the observation point group, wherein
   the acquiring the force curve comprises acquiring, for each of at least one Y-column extending along the X-direction, the force curve at each of a plurality of observation points on the Y-column, and
   the calculating the physical quantity comprises:
   generating, for each of the at least one Y-column, a force curve matrix indicating the force curve at each of the plurality of observation points on the Y-column; and
   calculating, for each of the at least one Y-column, the physical quantity at each of the plurality of observation points using the force curve matrix.

2. The surface analysis method according to claim 1, wherein the generating the force curve matrix comprises generating, as the force curve matrix, a combination of a force matrix indicating a change over time in a force acting on the probe at each of the plurality of observation points and a distance matrix indicating a change over time in a probe-surface distance at each of the plurality of observation points, the probe-surface distance being a distance between the probe and the sample surface.

3. The surface analysis method according to claim 2, wherein the generating the force curve matrix comprises converting the distance matrix such that a minimum value of the probe-surface distance is unified to 0 among the plurality of observation points.

4. The surface analysis method according to claim 1, wherein
the at least one Y-column comprises a plurality of the Y-columns, and
the outputting the analysis data comprises:
generating an intermediate image indicating a distribution of the physical quantity corresponding to the plurality of observation points, for each of the plurality of Y-columns;
generating one analysis image by connecting a plurality of the intermediate images along one direction; and
output the analysis data including the analysis image.

5. The surface analysis method according to claim 1, wherein
the calculating the physical quantity at each of the plurality of observation points comprises:
calculating a differential curve by calculating a first-order differentiation of the force curve according to a probe-surface distance which is a distance between the probe and the sample surface, for each of a plurality of the force curves indicated by the force curve matrix; and
calculating, for each of the plurality of observation points, a distance from the sample surface to a farthest peak as a breaking length of the organic material forming the sample surface, based on the differential curve corresponding to the observation point.

6. The surface analysis method according to claim 1, wherein
the acquiring the force curve at each of the plurality of observation points on the Y-column comprises:
acquiring, for each of the plurality of observation points, a voltage-movement curve indicating a relationship between an amount of movement of a piezoelectric element of the scanning probe microscope and a voltage of a detector of the scanning probe microscope; and
converting the voltage-movement curve into the force curve for each of the plurality of observation points.

7. The surface analysis method according to claim 6, wherein
the converting the voltage-movement curve into the force curve comprises:
calculating a probe-surface distance which is a distance between the probe and the sample surface by subtracting an amount of spring deflection of a cantilever having the probe from the amount of movement; and
calculating a force acting on the probe by multiplying a spring constant of the cantilever by the amount of spring deflection.

8. The surface analysis method according to claim 6, wherein
the acquiring the voltage-movement curve comprises:
generating a voltage matrix indicating a change over time in the voltage at each of the plurality of observation points; and
converting the voltage matrix such that the voltage corresponding to a maximum value of the amount of movement is unified to 0.

9. The surface analysis method according to claim 1, wherein the sample surface is a surface of powder not held by a carrier.

10. A Surface analysis system comprising at least one processor, wherein
the at least one processor is configured to execute:
acquiring a force curve corresponding to measurement of a sample surface by a scanning probe microscope, the scanning probe microscope performing the measurement at each of an observation point group on the sample surface by, while reciprocating a probe with respect to a stage along a X-direction along a horizontal surface, moving the probe in one direction with respect to the stage along a Y-direction which is along the horizontal surface and orthogonal to the X-direction;
calculating a physical quantity of an organic material forming the sample surface based on the force curve, for each of the observation point group; and
outputting analysis data indicating the physical quantity of each of the observation point group, and
wherein, in the acquiring the force curve, the at least one processor is configured to acquire, for each of at least one Y-column extending along the X-direction, the force curve at each of a plurality of observation points on the Y-column, and
wherein, in the calculating the physical quantity, the at least one processor is configured to:
generate, for each of the at least one Y-column, a force curve matrix indicating the force curve at each of the plurality of observation points on the Y-column; and
calculate, for each of the at least one Y-column, the physical quantity at each of the plurality of observation points using the force curve matrix.

11. A non-transitory computer-readable storage medium storing a surface analysis program causing a computer to execute:
acquiring a force curve corresponding to measurement of a sample surface by a scanning probe microscope, the scanning probe microscope performing the measurement at each of an observation point group on the sample surface by, while reciprocating a probe with respect to a stage along a X-direction along a horizontal surface, moving the probe in one direction with respect to the stage along a Y-direction which is along the horizontal surface and orthogonal to the X-direction;
calculating a physical quantity of an organic material forming the sample surface based on the force curve, for each of the observation point group; and
outputting analysis data indicating the physical quantity of each of the observation point group, wherein
the acquiring the force curve comprises acquiring, for each of at least one Y-column extending along the X-direction, the force curve at each of a plurality of observation points on the Y-column, and
the calculating the physical quantity comprises:
generating, for each of the at least one Y-column, a force curve matrix indicating the force curve at each of the plurality of observation points on the Y-column; and
calculating, for each of the at least one Y-column, the physical quantity at each of the plurality of observation points using the force curve matrix.

* * * * *